US011912819B2

(12) United States Patent
Lotz et al.

(10) Patent No.: US 11,912,819 B2
(45) Date of Patent: Feb. 27, 2024

(54) BIFURAN POLYESTERS

(71) Applicants: ExxonMobil Chemical Patents Inc., Baytown, TX (US); Virginia Tech Intellectual Properties, Inc., Blacksburg, VA (US)

(72) Inventors: Monica Lotz, Houston, TX (US); Kapil Kandel, Humble, TX (US); Michael Salciccioli, Houston, TX (US); Stephen Cohn, Spring, TX (US); Alan A. Galuska, Huffman, TX (US); Javier Guzman, Porter, TX (US); S. Richard Turner, Blacksburg, VA (US); Hans Eliot Edling, Radford, VA (US); Edward E. Paschke, Galena, IL (US)

(73) Assignees: ExxonMobil Chemical Patents, Inc., Baytown, TX (US); Virginia Tech Intellectual Properties, Inc., Blacksburg, VA (US)

( * ) Notice: Subject to any disclaimer, the term of this patent is extended or adjusted under 35 U.S.C. 154(b) by 184 days.

(21) Appl. No.: 17/284,717

(22) PCT Filed: Nov. 13, 2019

(86) PCT No.: PCT/US2019/061070
§ 371 (c)(1),
(2) Date: Apr. 12, 2021

(87) PCT Pub. No.: WO2020/106510
PCT Pub. Date: May 28, 2020

(65) Prior Publication Data
US 2021/0355271 A1    Nov. 18, 2021

Related U.S. Application Data

(60) Provisional application No. 62/770,064, filed on Nov. 20, 2018.

(51) Int. Cl.
C08G 63/185    (2006.01)
C08G 63/199    (2006.01)
C08G 63/80     (2006.01)
C08G 63/85     (2006.01)

(52) U.S. Cl.
CPC ......... *C08G 63/185* (2013.01); *C08G 63/199* (2013.01); *C08G 63/80* (2013.01); *C08G 63/85* (2013.01); *C08G 2120/00* (2013.01); *C08G 2250/00* (2013.01)

(58) Field of Classification Search
None
See application file for complete search history.

(56) References Cited

U.S. PATENT DOCUMENTS

| 9,527,952 | B1 * | 12/2016 | Sucheck | C08G 63/16 |
| 2010/0143546 | A1 * | 6/2010 | Kriegel | C08K 5/12 |
| | | | | 524/109 |
| 2021/0009545 | A1 * | 1/2021 | Kandel | C07D 407/14 |
| 2021/0355271 | A1 * | 11/2021 | Lotz | C08G 63/181 |
| 2022/0033573 | A1 * | 2/2022 | Lotz | C08G 63/85 |

FOREIGN PATENT DOCUMENTS

JP    2018150415    * 9/2018

OTHER PUBLICATIONS

Naoki Miyagawa et al "Preparation of Furan Dimer-based Biopolyester Showing High Melting Points", Chem. Lett. 2017, 46, 1535-1538, published Aug. 2017 (Year: 2017).*
Tuomo P. Kainulainen et al "UV-Blocking Synthetic Biopolymer from Biomass-Based Bifuran Diester and Ethylene Glycol", Macromolecules 2018, 51, 1822-1829, Published: Feb. 21, 2018 (Year: 2018).*
Amel Khrouf et al "Polyesters bearing furan moieties", Polymer Bulletin 37, 589-596 (1996) (Year: 1996).*

* cited by examiner

*Primary Examiner* — Frances Tischler
*Assistant Examiner* — Gennadiy Mesh
(74) *Attorney, Agent, or Firm* — Daniel N. Lundeen; Lundeen & Lundeen PLLC

(57) ABSTRACT

Semicrystalline polyethylene-2,2'-bifuran-5,5'-dicarboxylate (PEBF) homopolyester or copolyester with up to 5 mole percent isophthalate or up to 2.7 mole percent terephthalate, based on the diacid component, or up to 2.5 mole percent 1,4-cyclohexanedimethanol (CHDM), based on the diol component, prepared by esterifying or transesterifying the diacid and the diol components with a catalyst including about 10 to about 50 ppm wt metal, and polycondensation, wherein the bifuran polyester has an intrinsic viscosity of at least 0.4 g/dL and a semicrystalline melting peak (Tm) with ΔHf equal to or greater than 5 J/g on the second heating ramp.

17 Claims, 6 Drawing Sheets

… (1 / 2)

BIFURAN POLYESTERS

THE NAMES OF PARTIES TO A JOINT RESEARCH AGREEMENT

ExxonMobil Chemical Company, a division of ExxonMobil Corporation, and Virginia Polytechnic Institute and State University.

BACKGROUND OF THE INVENTION

There is a strong drive in the polyester industry to develop semicrystalline polyesters similar to polyethylene terephthalate (PET) using biobased monomers that can be more sustainable or renewable, e.g., in injection stretch blow-molding, biaxially oriented films, low shrink fibers, injection molded parts (especially glass reinforced), thermoformed trays, etc. The most visible and publicized effort is based on polyethylene furanoate (PEF) where terephthalate units are replaced by furanoate and the ethylene glycol (EG) is biosourced. The physical properties of PEF somewhat mirror PET except PEF exhibits much lower oxygen and carbon dioxide permeabilities and lower melting temperature. However, the glass transition temperature ($T_g$) for PEF, 92° C., is only somewhat better than for PET, 76° C., and still well below the 100° C. $T_g$ desired for hot fill and pasteurization processes used in the food packaging industry.

Semicrystalline polymers used in injection stretch blow-molding should desirably have a high degree of crystallinity, i.e., a distinct melting peak ($T_m$) and a high heat of fusion ($\Delta H_f$) as seen in the second heating ramp of differential scanning calorimetry (DSC). The crystallinity should be developed by strain, e.g., in the stretch/blow stage of injection stretch blow-molding. This is needed for clarity so that the resulting product can achieve crystal sizes smaller than visible light wavelengths. In contrast, if crystallinity is developed by a thermal process, the crystals may form large spherulites and the polyester may be undesirably opaque.

An ethylene-bifuranoate polyester, poly(ethylene 2,2'-bifuran-5,5'-dicarboxylate) (PEBF), was reported in Kainulainen et al., *Macromolecules,* 2018, 51(5), pp. 1822-1829. This PEBF had a $T_g$ of 107° C., and exhibited a semicrystalline melting peak ($T_m$) by DSC on the first melt. However, this PEBF did not suitably crystallize and as a practical matter was amorphous with no $T_m$ in the reheat cycle, even though 1 mol % titanate catalyst was used that should have provided adequate nucleation sites for crystallization. Moreover, the PEBF films were extremely brittle.

There thus remains an unmet need for new biobased semicrystalline polyesters from sustainable monomers having one or more or all of a $T_g$ above 100° C., a high degree of crystallinity that can be developed by strain, high modulus, high impact strength, and/or good barrier properties for oxygen, carbon dioxide, and/or water; while achieving properties suitable for one or more or all of injection stretch blow-molding, injection molded glass reinforced parts, biaxially oriented films, low shrink fibers, thermoformed trays, and the like.

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

Applicant has discovered a bifuran polyester with a high glass transition temperature ($T_g$) above 100° C. and that, unlike the poly(ethylene 2,2'-bifuran-5,5'-dicarboxylate) (PEBF) reported in the literature, exhibits a semicrystalline melting peak ($T_m$) with a high heat of fusion ($\Delta H_f$), e.g., 40 J/g or more, on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp. The polyester also has improved ductility and modulus relative to the literature PEBF. Applicant has also discovered a method of making bifuran polyester, preferably including use of a low level of catalyst, e.g., less than about 750 ppm metal.

Broadly, the present invention provides a bifuran polyester comprising a diacid component selected from polyfunctional carboxylate units and a diol component selected from polyfunctional hydroxyl units, wherein the diacid and/or the diol components comprise bifuran units, e.g., (i) the diacid component comprises bifuran polycarboxylate units; or (ii) the diol component comprises bifuran polyhydroxyl units; or (iii) the diacid component comprises bifuran polycarboxylate units and the diol component comprises bifuran polyhydroxyl units.

Preferably, the bifuran polyester comprises semicrystalline PEBF exhibiting a melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.

In another aspect of the invention, a method of making a bifuran polyester can comprise esterifying or transesterifying one or more monomers comprising a diacid component and a diol component, optionally in the presence of a catalyst; wherein the one or more monomers comprise a bifuran compound; and polycondensing the esterified or transesterified monomer(s) to form a bifuran polyester comprising the diacid component and the diol component. The one or more monomers may comprise, for example, a bifuran dicarboxylic acid such as 2,2'-bifuran-5,5'-dicarboxylic acid (BFA), a bifuran diester such as dimethyl-2,2'-bifuran-5,5'-dicarboxylate (BFE), and/or a di(hydroxyalkyl) bifuranoate such as bis(2-hydroxyethyl)-2,2'-bifuran-5,5'-dicarboxylate (BHEB), or a combination thereof. The catalyst may comprise, for example, a metal catalyst where the metal of the catalyst is present in an amount of from about 10 to 1500 ppm, preferably from about 100 to 750 ppm or from about 150 to 500 ppm or from about 200 to 400 ppm, based on the weight of theoretical yield of the polyester. Preferably, the method forms a semicrystalline bifuran polyester.

DETAILED DESCRIPTION OF THE PREFERRED EMBODIMENTS

Figure 1:
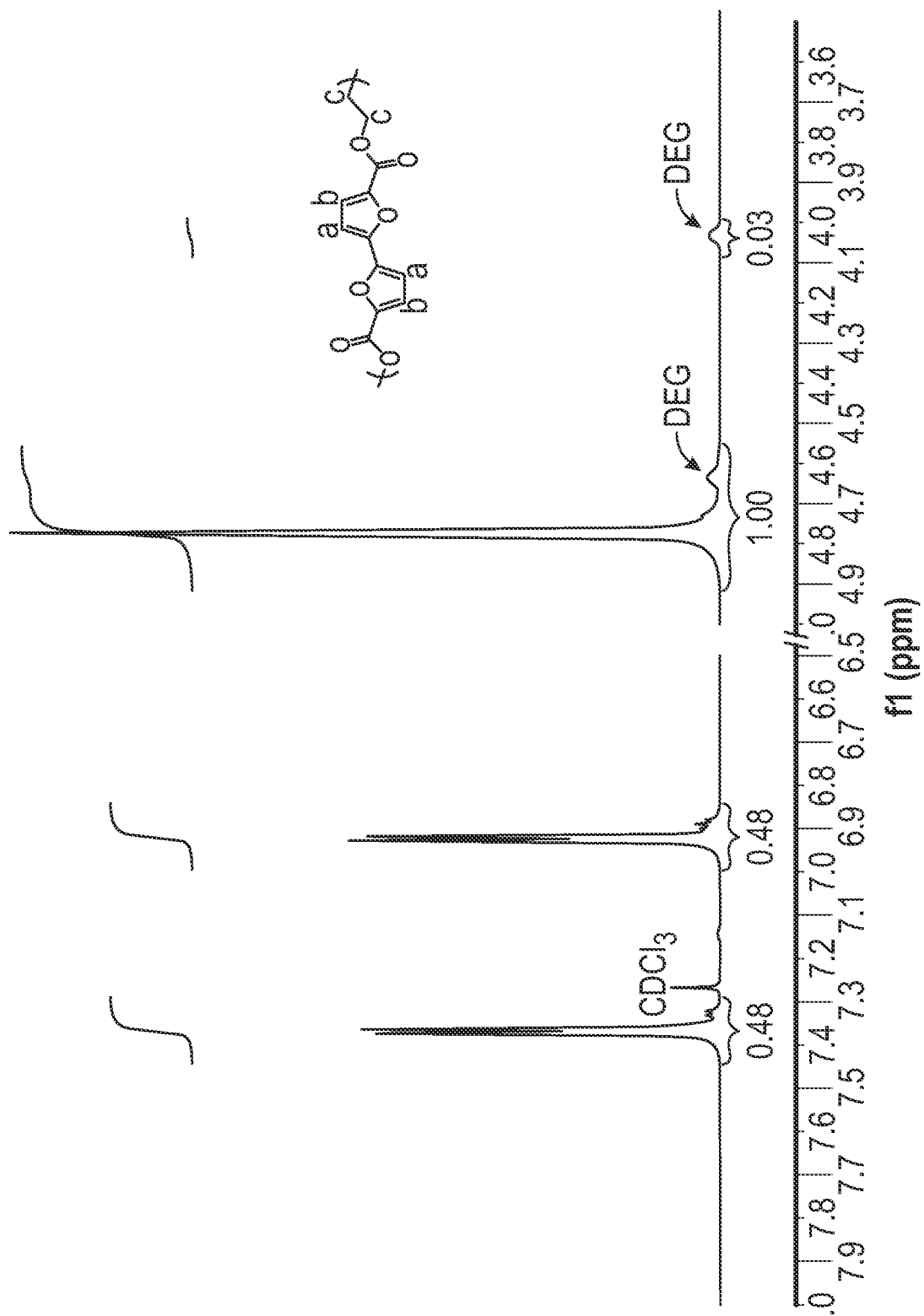
FIG. 1 is an NMR spectrum of the poly(ethylene-2,2'-bifuran-5,5'-dicarboxylate) (PEBF) of Example 1 below according to the present invention.

Throughout the entire specification, including the claims, the following terms shall have the indicated meanings.

The term "and/or" refers to both the inclusive "and" case and the exclusive "or" case, and such term is used herein for brevity. For example, a composition comprising "A and/or B" may comprise A alone, B alone, or both A and B.

Unless otherwise stated, the percentages of monomers are expressed herein as mole percent (mol %) based on the total moles of monomers present in the reference polymer or polymer component. All other percentages are expressed as weight percent (wt %), based on the total weight of the particular composition present, unless otherwise noted. Room temperature is 23° C. and atmospheric pressure is 101.325 kPa unless otherwise noted.

The term "consisting essentially of" in reference to a composition is understood to mean that the composition can include additional compounds other than those specified, in such amounts to the extent that they do not substantially interfere with the essential function of the composition, or if no essential function is indicated, in any amount up to 2 percent by weight of the composition.

For purposes herein, a "polymer" refers to a compound having two or more "mer" units, that is, a degree of polymerization of two or more, where the mer units can be of the same or different species. As discussed below, polyester mer units are carboxylic acid-hydroxyl functional esters derived from a diacid and a diol.

Unless otherwise indicated, reference to a polymer herein includes a homopolymer, a copolymer, a terpolymer, or any polymer comprising a plurality of the same or different species of repeating units. A "homopolymer" is a polymer having mer units or residues that are the same species, e.g., a homopolyester has ester residues derived from a single diacid and a single diol. A "copolymer" is a polymer having two or more different species of mer units or residues, e.g., a copolyester has more than one species of ester residues derived from more than one diacid and/or more than one diol. A "terpolymer" is a polymer having three different species of mer units. "Different" in reference to mer unit species indicates that the mer units differ from each other by at least one atom or are different isomerically.

The term "polyester," as used herein, refers to a polymer comprised of residues derived from one or more polyfunctional acid moieties, collectively referred to herein as the "diacid component," in ester linkage with residues derived from one or more polyhydroxyl compounds, which may also be referred to herein as "polyols" and collectively as the "diol component." As used herein, "diacid" and "diol" refer to polyfunctional acids and hydroxyls having two or more than two acid and hydroxyl functional groups, respectively.

The term "repeating unit," also referred to as the "mer" units, as used herein with reference to polyesters refers to an organic structure having a diacid component residue and a diol component residue bonded through a carbonyloxy group, i.e., an ester linkage. Reference to the equivalent terms "copolyesters" or "(co)polyesters" or "polyester copolymers" herein is to be understood to mean a polymer prepared by the reaction of two or more different diacid compounds or ester producing equivalents thereof that incorporate different diacid residues into the backbone, and/or two or more different diol compounds that incorporate different diol residues into the backbone, i.e., either one or both of the diacid and diol components incorporate a combination of different species into the polymer backbone.

As used herein, the prefixes di- and tri- generally refer to two and three, respectively, with the exception of diacid and diol components noted herein. Similarly, the prefix "poly-" generally refers to two or more, and the prefix "multi-" to three or more. The carboxylic acids and/or esters used to make the copolyesters, or the residues of which are present therein, are collectively referred to herein as the "diacid component," including both difunctional and multifunctional species thereof, or simply as the "acid component;" and likewise the hydroxyl compounds used to make the copolyesters, or the residues of which are present therein, are collectively referred to herein as the "diol component," including both difunctional and multifunctional species thereof, or simply as the hydroxyl or polyol component.

The polycarboxylic acid residues, e.g., the dicarboxylate mer units, may be derived from a polyfunctional acid monomer or an ester producing equivalent thereof. Examples of ester producing equivalents of polyfunctional acids include one or more corresponding acid halide(s), ester(s), salts, the anhydride, or mixtures thereof. As used herein, therefore, the term "diacid" is intended to include polycarboxylic acids and any derivative of a polycarboxylic acid, including its associated acid halides, esters, half-esters, salts, half-salts, anhydrides, mixed anhydrides, or mixtures thereof, capable of forming esters useful in a reaction process with a diol to make polyesters.

The term "residue," as used herein, means the organic structure of the monomer in its as-polymerized form as incorporated into a polymer, e.g., through an esterification, transesterification, and/or polycondensation reaction from the corresponding monomer(s). Throughout the specification and claims, reference to the monomer(s) in the polymer is understood to mean the corresponding as-polymerized form or residue of the respective monomer. For purposes herein, it is to be understood that by reference to a copolyester comprising a diacid component and a diol component, the diacid and diol components are present in the polymer in the as-polymerized (as-condensed) form. For example, the diacid component is present in the polymer as dicarboxylate in alternating ester linkage with the diol component, yet the polyester may be described as being comprised of, for example, the dicarboxylic acid or dicarboxylic acid alkyl ester and diol, where it is understood the alkyl ester groups in the starting material are not present in the polyester. For example, in terephthalic acid-ethylene glycol polyester or dimethyl terephthalate-ethylene glycol polyester, it is understood the acid or methyl ester groups in the starting material are not present in the polyester.

Mole percentages of the diacid and diol components are expressed herein based on the total moles of the respective component, i.e., the copolyesters comprise 100 mole percent of the polyfunctional acid component and 100 mole percent of the polyfunctional hydroxyl component. For purposes herein, when a composition specifies a component, for example, a diacid component, having a particular mole percent of a first compound with the balance or remainder of another compound or mixture of compounds, it is to be understood that the balance refers to the amount of the second compound necessary to equal 100 mole percent of that component, based on the total number of moles of all diacid compounds present, typically in polymerized form in the resultant copolyester. For example, a copolyester having a first diacid "A" from 30 to 60 mole percent with the balance being the second diacid component "B" refers to a copolyester comprising 30 to 60 mole percent diacid A and 70 to 40 mole percent diacid B.

In any embodiment where the diacid B may include at least one of a plurality of diacids B1 or B2, the 70 to 40 mole percent of diacid B refers to any combination of diacids B1 and B2 necessary to equal the required 70 to 40 mole percent of the total number of moles of all the diacid compounds present in polymerized form in the subject copolyester. It will be appreciated by those in the art that the moles of diacid and moles of diol may not be equal due to internal or end repeating blocks of the diacid and/or diol that sometimes may occur in polycondensation reactions.

In any embodiment where a diol-diacid diester or half ester is employed as a reagent, the diol moieties are considered as part of the diol component and the diacid moieties are considered as part of the diacid component. For example, a mole of bis(2-hydroxyethyl)-2,2'-bifuran-5,5'-dicarboxylate (BHEB), although technically a diol, supplies two moles of the diol component, ethylene glycol (EG), also called monoethylene glycol (MEG), and one mole of the diacid component 2,2'-bifuran-5,5'-dicarboxylate (BFE). A diester such as BHEB is considered to be a self-condensing monomer. As a sole reactant, BHEB can be transesterified to form the polyethylene bifuranoate polyester (poly(ethylene-2,2'-bifuran-5,5'-dicarboxylate), (PEBF)) and eliminate the diol (e.g., EG in this example), any excess of which can often be removed by distillation.

Unless indicated otherwise, for purposes herein a semicrystalline polymer is defined as a polymer exhibiting a substantially crystalline melting point, $T_m$, i.e., it has a distinct heat of fusion ($\Delta H_f$) of at least 5 J/g, when determined by a heat/cool/reheat differential scanning calorimetry (DSC) analysis from the second heating ramp by heating of the sample from 25° C. or 30° C. to 280° C. or 300° C. at a heating and cooling rate of 10° C./min or 15° C./min and holding the sample for 1 or 3 min between heating and cooling scans. For purposes herein, $T_m$, crystallization temperature ($T_c$), glass transition temperature ($T_g$), etc., are determined by DSC analysis from the second heating ramp. In the case of a conflict between heating and cooling rates or ranges, unless otherwise stated, the DSC scan at 10° C./min over the range 30° C. to 300° C. with hold times of 3 min shall control.

Unless indicated otherwise, inherent viscosity is determined in 0.5% (g/dL) dichloroacetic acid (DCA) solution at 25° C. by means of a CANNON TYPE B glass capillary viscometer, adapted from ASTM method D4603. Inherent viscosity ($\eta_{inh}$) is calculated as the ratio of the natural logarithm of the relative viscosity to the mass concentration of the polymer according to the equation (A):

$$\eta_{inh} = \frac{\ln \eta_{rel}}{c} \quad (A)$$

where c is the mass concentration of the polymer (g/dL) and $\eta_{rel}$ is the relative viscosity, which is determined according to the equation (B):

$$\eta_{rel} = \frac{\eta}{\eta_0} \quad (B)$$

where $\eta$ is the viscosity of the solution and $\eta_0$ is the viscosity of the neat solvent. Unless otherwise specified, inherent viscosity is expressed as dL/g.

The difunctional hydroxyl compound can be a dihydric alcohol such as, for example, glycols and diols. The term "glycol" as used in this application includes, but is not limited to, diols, glycols, and/or multifunctional hydroxyl compounds. In any embodiment, the difunctional hydroxyl compound may be a cyclic or aromatic nucleus bearing two hydroxyl substituents such as, for example, 2,2',4,4'-tetramethyl-1,3-cyclobutanediol (TMCD), 1,4-cyclohexanedimethanol (CHDM), as the cis or trans isomers, or a combination of cis and trans isomers, hydroquinone bis(betahydroxyethyl) ether, and/or the like.

The following additional abbreviations are used herein: BD is 1,4-butanediol; BFE is dimethyl-2,2'-bifuran-5,5'-dicarboxylate monomer or its as-polymerized form, 2,2'-bifuran-5,5'-dicarboxylate; BFA is 2,2'-bifuran-5,5'-dicarboxylic acid; BFD is 2,2'-bifuran-5,5'-dimethanol; BHEB is bis(2-hydroxyethyl)-2,2'-bifuran-5,5'-dicarboxylate; $CDCl_3$ is deuterated chloroform; DEG is diethylene glycol (2,2'-oxydi(ethan-1-ol)); DMI is dimethyl isophthalate; DMT is dimethyl terephthalate; GPC is gel permeation chromatography; HD is 1,6-hexanediol; I or IPA refers to isophthalic acid; NPG is neopentyl glycol, 2,2-dimethyl-1,3-propanediol; PBBF is poly(1,4-butylene-bifuranoate); PD is 1,3-propanediol; PHBF is poly(1,6-hexylene bifuranoate); PET is polyethylene terephthalate; PPBF is poly(1,3-propylene bifuranoate); SSP is solid state polymerization; T or TPA refers to terephthalic acid; TFA is trifluoroacetic acid; $T_{d,5\%}$ is thermal degradation temperature determined as the temperature at which a sample loses 5 wt % in a thermogravimetric analysis; TFA-d is deuterated trifluoroacetic acid; the letter "d" prior to a chemical name also indicates a deuterated compound; TGA is thermogravimetric analysis; THF is tetrahydrofuran.

Semicrystalline Bifuran Polyesters

In an embodiment according to this invention, a semicrystalline bifuran polyester comprises a diacid component selected from polyfunctional carboxylate units, and a diol component selected from polyfunctional hydroxyl units, wherein the diacid and/or the diol components comprise bifuran units, e.g., (i) the diacid component comprises bifuran polycarboxylate units, or (ii) the diol component comprises bifuran polyhydroxyl units; or (iii) the diacid component comprises bifuran polycarboxylate units and the polyol component comprises bifuran polyhydroxyl units. The bifuran polyester may exhibit a melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.

The bifuran polyester preferably comprises semicrystalline polyethylene-2,2'-bifuran-5,5'-dicarboxylate (PEBF) exhibiting a melting peak ($T_m$) with $\Delta H_f$ equal to or greater than 5 J/g on the second heating ramp in a heat/cool/reheat differential scanning calorimetry (DSC) scan over a temperature range from 30° C. to 300° C. The PEBF preferably exhibits one or more or all of the following on the second heating ramp in a heat/cool/reheat DSC scan over a temperature range from 30° C. to 300° C. with heating and cooling rates of 10° C./min and holding the sample at temperature for 3 min before and after the cooling ramp: $T_g$ equal to or greater than 100° C., preferably equal to or greater than 105° C., more preferably equal to about 105° C. to 108° C.; $T_m$ equal to or less than 260° C., preferably equal to or less than 255° C.; and/or $\Delta H_f$ equal to or greater than 10 J/g, preferably equal to or greater than 20 J/g, equal to or greater than 30 J/g, or equal to or greater than 40 J/g.

In any embodiment of the invention, (a) melt pressed specimen of the bifuran polyester, e.g., PEBF, has one or more or all of the following tensile properties measured according to ASTM D638:
a yield stress equal to or greater than 80 MPa, preferably equal to or greater than 150 MPa;
a tensile stress at break equal to or greater than 50 MPa, preferably equal to or greater than 100 MPa;
an elongation at break equal to or greater than 10%, preferably equal to or greater than 20%; or
a Young's modulus equal to or greater than 2600 MPa, preferably equal to or greater than 2800 MPa, preferably equal to or greater than 3000 MPa, preferably equal to or greater than 3100 MPa, preferably equal to or greater than 3200 MPa; and/or
(b) an injection molded specimen of the bifuran polyester, e.g., PEBF, has one or more or all of the following tensile properties measured according to ASTM D638:
flexural modulus equal to or greater than 2500 MPa, preferably equal to or greater than 3000 MPa;
a tensile modulus equal to or greater than 3000 MPa, preferably equal to or greater than 4000 MPa; or
a tensile stress at maximum load equal to or greater than 40 MPa, preferably equal to or greater than 60 MPa, preferably equal to or greater than 100 MPa.

Preferably the PEBF has one or more or all of the following tensile properties measured from a melt-pressed specimen according to ASTM D638: a yield stress equal to or greater than 150 MPa; a tensile stress at break equal to or greater than 100 MPa; an elongation at break equal to or greater than 20%; or a tensile modulus equal to or greater than 2800 MPa, preferably equal to or greater than 3000 MPa, preferably equal to or greater than 3100 MPa, preferably equal to or greater than 3200 MPa. For example, melt-pressed PEBF according to the present invention may have a yield stress greater than 150 MPa; a tensile stress at break greater than 100 MPa; an elongation at break greater than 20%; and a Young's modulus greater than 3200 MPa.

In one aspect of the invention, the diacid component comprises, or preferably consists of or consists essentially of, 2,2'-bifuran-5,5'-dicarboxylate units, e.g., derived from BFA, BFE, and/or BHEB, and the diol component comprises dihydroxyalkyl and/or cyclic diol units, preferably wherein the diol component comprises, consists of, or consists essentially of ethylene glycol (EG), 1,4-butanediol (BD), 1,6-hexanediol (HD), 1,3-propanediol (PD), 1,4-cyclohexanedimethanol (CHDM), and/or 2,2',4,4'-tetramethyl-1,3-cyclobutanediol (TMCD).

The bifuran polyester can be a homopolyester, e.g., PEBF, poly(1,4-butylene-bifuranoate) (PBBF), poly(1,6-hexylene bifuranoate) (PHBF), poly(1,3-propylene bifuranoate) (PPBF), or the like. The polyester can also be a copolyester, e.g., PEBF, PBBF, PHBF, or PPBF modified with from about 1 to 50 (preferably 1 to 10) mole percent CHDM and/or TMCD, based on the moles of the diol component.

In any embodiment of the invention, the diol component can be selected from the group consisting of: aliphatic polyols, preferably $C_2$-$C_{20}$ alkylene diols (preferably having from 2 to 10 or from 2 to 6 carbon atoms), $C_4$-$C_{20}$ cyclic polyols, and combinations thereof, preferably wherein the diol component is selected from EG, BD, HD, TMCD, PD, CHDM, neopentyl glycol (NPG), 1,2-propanediol, 1,5-pentanediol, isosorbide, isoidide, isomannide, 1,3-cyclohexanedimethanol, p-xylene glycol, and combinations thereof, or EG, BD, HD, and PD; or the diol component comprises, consists essentially of, or consists of EG; or the diol component comprises CHDM and/or TMCD; or the diol component can comprise a combination of an aliphatic diol, preferably EG or BD, and a cyclic diol, preferably TMCD or CHDM, preferably from 1 to 10 mole percent TMCD and/or CHDM, based on the total moles of diol component in the copolyester; and/or the diol component can comprise a polyhydroxy furan compound; and/or the diol component can comprise a dihydroxyalkyl bifuran, preferably 2,2'-bifuran-5,5'-dimethanol (BFD).

In any embodiment of the invention, the diacid component can comprise 2,2'-bifuran-5,5'-dicarboxylate units and a polyfunctional carboxylate comonomer, preferably wherein the polyfunctional carboxylate comonomer is selected from terephthalate, isophthalate, furan dicarboxylate, naphthalate, bibenzoate (including 3,4'-biphenyl dicarboxylate and/or 4,4'-biphenyl dicarboxylate), 1,4-cyclohexanedicarboxylate, 1,3-cyclohexanedicarboxylate, succinate, glutarate, adipate, azelate, sebacate, and combinations thereof, preferably wherein the polyfunctional carboxylate comonomer comprises terephthalate or isophthalate.

The diacid component can comprise from about 80 to 99 mole percent 2,2'-bifuran-5,5'-dicarboxylate units and from about 20 to 1 mole percent polyfunctional carboxylate comonomer, preferably terephthalate or isophthalate, based on the total moles of the diacid component in the copolyester, preferably wherein a sum of the mole percent 2,2'-bifuran-5,5'-dicarboxylate units and the mole percent polyfunctional carboxylate comonomer totals 100; preferably from 90 to 98 mole percent 2,2'-bifuran-5,5'-dicarboxylate units and from 10 to 2 mole percent polyfunctional carboxylate comonomer, preferably terephthalate or isophthalate, based on the total moles of the diacid component in the copolyester, preferably wherein a sum of the mole percent 2,2'-bifuran-5,5'-dicarboxylate units and the mole percent polyfunctional carboxylate comonomer totals 100; or more preferably from 92 to 97 mole percent 2,2'-bifuran-5,5'-dicarboxylate units and from 8 to 3 mole percent polyfunctional carboxylate comonomer, preferably terephthalate or isophthalate, based on the total moles of the diacid component in the copolyester, preferably wherein a sum of the mole percent BFE and the mole percent polyfunctional carboxylate comonomer totals 100. If desired, a termonomer may be present, e.g., where the sum of the mole percent 2,2'-bifuran-5,5'-dicarboxylate units and the mole percent polyfunctional carboxylate comonomer is less than 100.

It is believed the polyfunctional carboxylate comonomer may reduce $T_m$, with no or only an insubstantial change in $T_g$. In any embodiment of the invention, the polyfunctional carboxylate comonomer can be present in an amount effective to modify melting temperature ($T_m$) (preferably decrease) of the 2,2'-bifuran-5,5'-dicarboxylate-co-polyfunctional carboxylate comonomer polyester without substantially decreasing $T_g$, relative to a 2,2'-bifuran-5,5'- dicarboxylate homopolyester having the same diol composition, as determined by DSC. Preferably, the $T_m$ is decreased by an amount equal to or greater than 5° C. (preferably a decrease greater than 6° C. or a decrease greater than 8° C.) and the $T_g$ is decreased by an amount equal to or less than 5° C. (preferably a decrease of no more than 3° C.) relative to a 2,2'-bifuran-5,5'-dicarboxylate homopolyester prepared with the same diol component. For purposes of comparison, the BFE homopolyester is prepared in the same manner using the same catalyst in the same proportion with the same temperature profile as the BFE-co-polyfunctional carboxylate comonomer polyester.

In another aspect of the invention, a reinforced composition may comprise 100 parts by weight of the bifuran polyester described herein and from 1 to 100 parts by weight of a reinforcement material, preferably glass fibers, carbon fibers, carbon nanotubes, minerals, and combinations thereof.

The bifuran polyester described herein may be used in a shaped article, preferably a container, film, fiber, or injection molded part, especially a biaxially oriented film, low shrink fibers, a thermoformed tray, or an injection molded part reinforced with glass fibers, carbon fibers, carbon nanotubes, minerals, and combinations thereof.

The bifuran polyester described herein may also contain conventional additives such as pigments, colorants, stabilizers, antioxidants, extrusion aids, reheat agents, slip agents, carbon black, flame retardants, anti-stick agents, and mixtures thereof. In any embodiment, the polyester may also include modifiers and/or blend polymers including polyamides; e.g., NYLON 6,6® (DuPont), poly(ether-imides), polyphenylene oxides, e.g., poly(2,6-dimethylphenylene oxide), poly(phenylene oxide)/polystyrene blends; e.g., NORYL® (SABIC Innovative Plastics), other polyesters, polyphenylene sulfides, polyphenylene sulfide/sulfones, poly(ester-carbonates), polycarbonates; e.g., LEXAN® (SABIC Innovative Plastics), polysulfones, polysulfone ethers, poly(ether-ketones), combinations thereof, and the like.

Methods of Making the Bifuran Polyesters

In another aspect of the invention, a method of making a bifuran polyester can comprise esterifying or transesterifying one or more monomers comprising a diacid component and a diol component, optionally in the presence of a catalyst, wherein the one or more monomers comprise a bifuran compound, e.g., bifuran dicarboxylic acid, bifuran dicarboxylate, and/or di(hydroxyalkyl) bifuranoate, and polycondensing the esterified or transesterified monomer(s) to form a bifuran polyester comprising the diacid component and the diol component.

For example, the one or more monomers can include a bifuran dicarboxylic acid and/or a di(hydroxyalkyl) bifuranoate; preferably wherein the one or more monomers comprise 2,2'-bifuran-5,5'-dicarboxylic acid (BFA), di(hydroxyalkyl)-2,2'-bifuran-5,5'-dicarboxylate (preferably bis(2-hydroxyethyl)-2,2'-bifuran-5,5'-dicarboxylate (BHEB)), or a combination thereof; and wherein the catalyst, if present, comprises a Brønsted or Lewis acid.

As another example, the one or more monomers can include a bifuran diester and/or a di(hydroxyalkyl) bifuranoate, preferably wherein the one or more monomers comprise dialkyl-2,2'-bifuran-5,5'-dicarboxylate, di(hydroxyalkyl)-2,2'-bifuran-5,5'-dicarboxylate, or a combination thereof, more preferably wherein the one or more monomers comprise dimethyl-2,2'-bifuran-5,5'-dicarboxylate (BFE) and/or bis(2-hydroxyethyl)-2,2'-bifuran-5,5'-dicarboxylate (BHEB); wherein the catalyst is present, and preferably comprises a metal catalyst.

In any embodiment, the catalyst can comprise a metal catalyst, including a plurality of metal catalysts. The metal of the catalyst can be present in the reaction in an amount of from about 10 to 1500 ppm, preferably from about 100 to 750 ppm or from about 150 to 500 ppm, more preferably from about 200 to 400 ppm, especially 200 to 300 ppm, based on the weight of theoretical yield of the polyester. When a plurality of metal catalysts are employed, the total metal of the catalyst is preferably present in the reaction in an amount of from about 10 to 1500 ppm, preferably from about 100 to 750 ppm, and each metal individually preferably comprise from about 50 to 300 ppm, based on the weight of theoretical yield of the polyester. The metal of the catalyst is preferably selected from the group consisting of antimony, titanium, zinc, tin, manganese, zinc, aluminum, cobalt, bismuth, germanium, and mixtures thereof; more preferably one or more of titanium, tin, manganese, zinc, and antimony.

The method can form a bifuran polyester comprising, consisting of, or consisting essentially of poly(ethylene bifuranoate) and exhibiting a semicrystalline melting peak ($T_m$) with $\Delta H_f$ equal to or greater than 5 J/g on the second heating ramp in a heat/cool/reheat DSC scan over a temperature range from 30° C. to 300° C. with heating and cooling rates of 10° C./min and holding the sample at temperature for 3 min before and after the cooling ramp. Preferably, the bifuran polyester formed exhibits one or more or all of the following:

$T_g$ equal to or greater than 100° C., preferably equal to or greater than 105° C., more preferably equal to about 105° C. to 108° C.;

$T_m$ equal to or less than 260° C., preferably equal to or less than 255° C.; and/or $\Delta H_f$ equal to or greater than 10 J/g, preferably equal to or greater than 20 J/g, or equal to or greater than 30 J/g, or more preferably equal to or greater than 40 J/g.

In any embodiment of the invention, the esterification or transesterification and polycondensation can be in a melt phase, optionally followed by pelletization, crystallization, and/or solid state polymerization (SSP).

Esterification and polycondensation of dicarboxylic acid monomers, e.g., BFA, have the advantages of a faster reaction, and the release of water, which does not need to be recycled, is not flammable, and is nontoxic. Esterification allows low diol:diacid ratios closer to stoichiometric, with less diol recycle. The water and excess diol are often removed by distillation. When the monomers comprise a bifuran dicarboxylic acid, any diacid comonomers should also be dicarboxylic acids. While catalyst is optional, the kinetics may be improved by using an esterification catalyst such as a Brønsted or Lewis acid. The Brønsted acids may be strong mineral acids such as sulfuric acid, nitric acid, or hydrochloric acid. Suitable Lewis acids include compounds of metals such as the chlorides, bromides, tosylates, alkoxides and triflates of metal selected from the group consisting of antimony, titanium, zinc, tin, manganese, zinc, aluminum, cobalt, bismuth, germanium, and mixtures thereof. It is also possible to use organic esters of the metal acids, such as the alkyl esters of titanic acid, stannic acid and the like.

Transesterification and polycondensation of the alkyl diesters of the dicarboxylic acids with the diol, often using a catalyst, eliminates alkyl alcohol, which is often removed by distillation along with any excess diol. For example, when BFE and/or DMT are used, methanol is formed in addition to the polymer or prepolymer. Diesters often have high purity, which can lead to better, and better-defined, polymer properties.

Transesterification catalysts herein may comprise one or a combination of metal catalysts as mentioned above, preferably one or more of titanium, tin, manganese, zinc, antimony and the like. For example, suitable metal catalysts for transesterification and polycondensation can include titanium compounds such as tetraalkyl titanate $Ti(OR)_4$, e.g., tetraisopropyl titanate, tetra-n-butyl titanate, and tetrakis(2-ethylhexyl) titanate, and titanium chelates such as acetylacetonate titanate, ethyl acetoacetate titanate, triethanolamine titanate, lactic acid titanate; bismuth compounds such as bismuth oxide; germanium compounds such as germanium dioxide; zirconium compounds such as tetraalkyl zirconates; tin compounds such as butyl stannoic acid, tin oxides and alkyl tins; antimony compounds such as antimony trioxide and antimony triacetate; aluminum compounds such as aluminum carboxylates and alkoxides, and inorganic acid salts of aluminum; cobalt compounds such cobalt acetate; manganese compounds such as manganese acetate; zinc compounds such as zinc acetate; and combinations thereof. Additionally, a phosphorus compound can be used as a stabilizer. Thus, suitable metal catalyst systems can be based on various combinations of metal systems and/or stabilizers, e.g., Sb/Mn/Zn, Ti/P, Mn/Ti/P, Mn/Ti/Co/P, Zn/Al, Zn/Ti/Co/P, and so on. Suitable metal catalysts are generally commercially available or prepared by known methods.

The metal of the catalyst is often present in an amount of from about 10 to 1500 ppm, preferably from about 100 to 750 ppm or from about 150 to 500 ppm, more preferably from about 200 to 400 ppm, or 200 to 300 ppm, based on the weight of theoretical yield of the polyester. The catalyst preferably comprises a plurality of metal catalysts, and the total metal of the catalyst can be present in an amount of from about 10 to 1500 ppm, preferably from about 100 to 750 ppm, where each metal can be individually present at from, for example, about 50 to 300 ppm, based on the weight of theoretical yield of the polyester.

In any embodiment of the invention, a diol diester such as bis(hydroxyalkyl) bifuranoate, e.g., BHEB, may be employed as a monomer or comonomer. The diol diester can be formed in situ during esterification or transesterification, but is often prepared ex situ with an excess of diol, and optionally isolated and/or purified. The isolated diol diesters can be considered a self-condensing monomer which releases one of the diol groups, or they can be combined with the dicarboxylic acids for esterification, or with the diesters for transesterification.

For preparation of the polyester in the melt, the esterification/transesterification/polycondensation reactors are often equipped with a stirrer, an inert gas inlet, a thermocouple, a distillation column connected to a water-cooled condenser, a water or alcohol separator, and a vacuum connection tube. For example, the equipment and procedures disclosed in U.S. Pat. Nos. 4,093,603 and 5,681,918, incorporated by reference herein, may be adapted for implementing the present invention. The reaction can be a batch, semi-batch, or continuous process comprising introducing the diacid and diol components and catalyst, when used, into the reactor, and heating to a temperature in the range of from 160° C. to 290° C., preferably from 200° C. to 280° C., depending on the particular diacid, diol and bifuran comonomer components. The temperature is often gradually increased from a range of about 160° C. to 200° C. in the initial reaction stages up to a range of about 260° C. to 290° C. in the later stages, depending on the particular diacid, diol and bifuran comonomer components.

Water or the alkyl alcohol and any excess diol are often removed by distillation at atmospheric or near-atmospheric pressure in the initial stages, and/or with a vacuum applied, e.g., pressures below about 130 Pa (1 mm Hg), for example 13.3-40 Pa, in later stages. An inert gas such as nitrogen is often used to sweep the vapor phase from the reactor to shift the equilibrium and promote high molecular weight polycondensation. If desired, the degree of esterification may be monitored by measuring the amount of esterification acid or alcohol formed and the properties of the polyester, for example, viscosity, hydroxyl number, acid number, and so on. After the melt reaches a suitable viscosity, it is discharged from the reactor and may be directly formed into films or spun into fibers, or may be solidified and pelletized or otherwise formed into chips.

If desired, optional stabilizers, for example, phenolic antioxidants such as IRGANOX 1010 or phosphonite- and phosphite-type stabilizers such as tributylphosphite, can be added, preferably in an amount from 0 to 1 percent by weight of the reactants. Diethylene glycol (DEG) formation suppressors may include compounds such as choline, tetraethylammonium hydroxide (TEAOH), tetramethylammonium hydroxide (TMAOH), tetrabutylammonium hydroxide, salts of carboxylic acids such as calcium or sodium acetate, basic salts of mineral acids, such as $Na_2SO_4$ and $Na_2HPO_4$, alkali metal hydroxides, such as sodium hydroxide, or the like, preferably in an amount from 0.01 to 1 mmol/mol diacid component. In general, the conventional additives including pigments, colorants, stabilizers, antioxidants, extrusion aids, reheat agents, slip agents, carbon black, flame retardants, anti-stick agents, and mixtures thereof, can be added. In any embodiment, the polyester may be combined or blended with one or more modifiers and/or blend polymers including polyamides; e.g., NYLON 6,6® (DuPont), poly(ether-imides), polyphenylene oxides, e.g., poly(2,6-dimethylphenylene oxide), poly(phenylene oxide)/polystyrene blends; e.g., NORYL® (SABIC Innovative Plastics), other polyesters, polyphenylene sulfides, polyphenylene sulfide/sulfones, poly(ester-carbonates), polycarbonates; e.g., LEXAN® (SABIC Innovative Plastics), polysulfones, polysulfone ethers, poly(ether-ketones), combinations thereof, and the like.

Preferably, the reaction may comprise esterification or transesterification and polycondensation to form a prepolymer, followed by pelletization, crystallization, and solid state polymerization (SSP). The prepolymer preferably has an inherent viscosity of from about 0.4 to 0.6 dL/g, depending on the diacid, diol, comonomer, and intended use of the polyester. Solid state polymerization of the crystallized prepolymer is often performed in a temperature range from a glass transition temperature of the prepolymer up to a melting temperature of the prepolymer, and increases the inherent viscosity, preferably to an inherent viscosity of 0.9 dL/g or more. SSP may be used to obtain high molecular weight, e.g., for stretch blow molding of bottles, etc., while minimizing degradation and avoiding the excessively high melt viscosity and/or long residence times needed to achieve the target inherent viscosity or molecular weight in a melt reactor.

In any embodiment, SSP can comprise placing the prepolymer in a rotary evaporator and rotating the evaporator, preferably with flowing nitrogen and/or under vacuum. Anti-stick agent(s) may be used to inhibit sticking of the prepolymer pellets during SSP. SSP catalyst may be different than the molten esterification/transesterification/polycondensation catalyst and added to the prepolymer pellets, or conveniently it may be the same catalyst and/or may be added to or with the monomers or other prepolymer reactants so that it is already present in the prepolymer. Suitable SSP catalysts may include one or more compounds of metal, such as antimony, manganese, zinc, titanium, or a combination thereof. Preferably, the SSP catalyst comprises antimony oxide, manganese acetate, zinc acetate, or a combination thereof, preferably wherein the total metal of the catalyst is present in an amount of from about 10 to 1500 ppm, more preferably from about 100 to 750 ppm, or from about 150 to 500 ppm, or from about 200 to 400 ppm, or 200 to 300 ppm, based on the weight of the prepolymer.

Additional procedures, equipment, and methods for preparation of polyesters in the melt or by SSP are described in WO 2015/137804A1, WO 2015/137805A1, WO 2015/137806A1, WO 2015/137807A1, and WO 2018/071383A1, which are hereby incorporated herein by reference.

In any embodiment, the one or more monomers can further comprise a polyfunctional carboxylate comonomer, preferably wherein the polyfunctional carboxylate comonomer is selected from terephthalic acid (TPA), isophthalic acid (IPA), furan dicarboxylic acid (FDA), dialkyl furanoate (including dimethyl furanoate (DMF)), naphthalic acid, bibenzoic acid (including 3,4'-biphenyl dicarboxylic acid and/or 4,4'-biphenyl dicarboxylic acid), 1,4-cyclohexanedicarboxylic acid, 1,3-cyclohexanedicarboxylic acid, succinic acid, glutaric acid, adipic acid, azelaic acid, sebacic acid, or an ester forming equivalent and/or combination thereof, preferably TPA or IPA or an ester forming equivalent thereof.

In any embodiment of the method of the invention, the one or more monomers can comprise:

from about 80 to 99 mole percent BFA or BFE and from about 20 to 1 mole percent polyfunctional carboxylate comonomer, preferably TPA or IPA, preferably wherein a sum of the mole percent BFA or BFE and the mole percent polyfunctional carboxylate comonomer totals 100, based on the total moles of the diacid component;

preferably from 90 to 98 mole percent BFA or BFE and from 10 to 2 mole percent polyfunctional carboxylate comonomer, preferably TPA or IPA, preferably wherein a sum of the mole percent BFA or BFE and the mole percent polyfunctional carboxylate comonomer totals 100, based on the total moles of the diacid component;

more preferably from 92 to 97 mole percent BFA or BFE and from 8 to 3 mole percent polyfunctional carboxylate comonomer, preferably TPA or IPA, preferably wherein a sum of the mole percent BFA or BFE and the mole percent polyfunctional carboxylate comonomer totals 100, based on the total moles of the diacid component.

In any embodiment of the invention, the diol component is selected from the group consisting of: aliphatic polyols, preferably $C_2$-$C_{20}$ alkylene diols (preferably having from 2 to 10 or from 2 to 6 carbon atoms); $C_4$-$C_{20}$ cyclic polyols; and combinations thereof, preferably the diol component is selected from ethylene glycol (EG), 1,4-butanediol (BD), 1,6-hexanediol (HD), 2,2,4,4-tetramethyl-1,3-cyclobutanediol (TMCD), 1,3-propanediol (PD), 1,4-cyclohexanedimethanol (CHDM), neopentyl glycol (NPG), 1,2-propanediol, 1,5-pentanediol, isosorbide, isoidide, isomannide, 1,3-cyclohexanedimethanol, p-xylene glycol, and combinations thereof, or more preferably the diol component is selected from EG, BD, HD, or PD; or more preferably the diol component comprises, consists essentially of, or consists of ethylene glycol; or more preferably the diol component comprises CHDM and/or TMCD; or more preferably the diol component comprises a combination of an aliphatic diol, preferably ethylene glycol or 1,4-butanediol, and a cyclic diol, preferably TMCD or CHDM, preferably from 1 to 10 mole percent TMCD and/or CHDM, based on the total moles of diol component in the copolyester; and/or preferably the one or more monomers comprise or further comprise furan dicarboxylic acid, dialkyl furanoate, or dihydroxyalkyl furanoate (preferably 2,5-dihydroxyethyl furanoate); and/or preferably the diol component comprises, further comprises, consists of, or consists essentially di(hydroxyalkyl) bifuran, preferably 2,2'-bifuran-5,5'-dimethanol (BFD).

Any of the polyesters and compositions described herein may be used in the preparation of molded products in any molding process, including but not limited to, injection molding, gas-assisted injection molding, extrusion blow molding, injection blow molding, injection stretch blow molding, compression molding, rotational molding, foam molding, thermoforming, sheet extrusion, and profile extrusion. The molding processes are well known to those of ordinary skill in the art. The polyester compositions described above may also be used in the preparation of nonwoven fabrics and fibers. In any embodiment, a shaped article such as an extruded profile or an extruded or injection molded article can comprise one or more polyesters according to one or more embodiments disclosed herein. Accordingly, in any embodiment, polyesters according to the instant invention can generally be molded and extruded using conventional melt processing techniques to produce a shaped article.

Shaped articles comprising any embodiment of the polymers disclosed herein may generally be produced using thermoplastic processing procedures such as injection molding, calendaring, extrusion, blow molding, extrusion blow molding, injection stretch-blow molding, rotational molding, and so on. For example, the method may comprise reinforcing the bifuran polyester, preferably by combining 100 parts by weight of the bifuran polyester and from 1 to 100 parts by weight of a reinforcement material, preferably glass fibers, carbon fibers, carbon nanotubes, minerals, and the like, including combinations thereof. Or, the method may comprise forming the bifuran polyester into a shaped article, preferably a container, film, fiber, or injection molded part, e.g., a biaxially oriented film, low shrink fibers, a glass-reinforced injection molded part, or a thermoformed tray. In particular, the forming step may comprise injection stretch blow-molding.

EMBODIMENTS

Accordingly, the present invention provides the following nonlimiting embodiments:

1. Bifuran polyester comprising:
 a diacid component selected from polyfunctional carboxylate units;
 a diol component selected from polyfunctional hydroxyl units;
 wherein:
 (i) the diacid component comprises bifuran polycarboxylate units; or (ii) the diol component comprises bifuran polyhydroxyl units; or
(iii) the diacid component comprises bifuran polycarboxylate units and the polyol component comprises bifuran polyhydroxyl units.
2. The bifuran polyester of embodiment 1, wherein the bifuran polyester exhibits a semicrystalline melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.
3. The bifuran polyester of embodiment 1 or embodiment 2, wherein the bifuran polyester exhibits a semicrystalline melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 15° C./min and holding the sample at temperature for 3 min before and after the cooling ramp; preferably wherein the $\Delta H_f$ is equal to or greater than 20 J/g, preferably equal to or greater than 30 J/g, more preferably equal to or greater than 40 J/g.
4. The bifuran polyester of any of the preceding embodiments, comprising semicrystalline polyethylene-2,2'-bifuran-5,5'-dicarboxylate (PEBF) exhibiting a melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.
5. The bifuran polyester of embodiment 4 wherein the PEBF exhibits one or more or all of the following on the second heating ramp in a heat/cool/reheat DSC scan over a temperature range from 30° C. to 300° C. with heating and cooling rates of 10° C./min (and/or 15° C.) and holding the sample at temperature for 3 min before and after the cooling ramp: $T_g$ equal to or greater than 100° C. (preferably equal to or greater than 105° C., more preferably equal to about 105° C. to 108° C.); $T_m$ equal to or less than 260° C. (preferably equal to or less than 255° C.); and/or $\Delta H_f$ equal to or greater than 10 J/g (preferably equal to or greater than 20 J/g, equal to or greater than 30 J/g, or equal to or greater than 40 J/g).
6. The bifuran polyester of embodiment 4 or embodiment 5, wherein:
(a) a melt pressed specimen of the bifuran polyester has one or more or all of the following tensile properties measured from a melt-pressed specimen according to ASTM D638:
a yield stress equal to or greater than 80 MPa, preferably equal to or greater than 150 MPa;
a tensile stress at break equal to or greater than 50 MPa, preferably equal to or greater than 100 MPa;
an elongation at break equal to or greater than 10%, preferably equal to or greater than 20%; or
a Young's modulus equal to or greater than 2600 MPa, preferably equal to or greater than 2800 MPa, preferably equal to or greater than 3000 MPa, preferably equal to or greater than 3100 MPa, preferably equal to or greater than 3200 MPa; and/or
(b) an injection molded specimen of the bifuran polyester has one or more or all of the following tensile properties measured from an injection molded specimen according to ASTM D638:
flexural modulus equal to or greater than 2500 MPa, preferably equal to or greater than 3000 MPa;
a tensile modulus equal to or greater than 3000 MPa, preferably equal to or greater than 4000 MPa; or
a tensile stress at maximum load equal to or greater than 40 MPa, preferably equal to or greater than 60 MPa, preferably equal to or greater than 100 MPa.
7. The bifuran polyester of any preceding embodiment, wherein the diacid component comprises, or preferably consists of, or consists essentially of 2,2'-bifuran-5,5'-dicarboxylate units, preferably derived from BFA, BFE, and/or BHEB, and the diol component comprises dihydroxyalkyl and/or cyclic diol units, preferably wherein the diol component comprises, consists of, or consists essentially of ethylene glycol (EG), 1,4-butanediol (BD), 1,6-hexanediol (HD), 1,3-propanediol (PD), 1,4-cyclohexanedimethanol (CHDM), and/or 2,2',4,4'-tetramethyl-1,3-cyclobutanediol (TMCD).
8. The bifuran polyester of any preceding embodiment, wherein the bifuran polyester comprises PEBF copolyester wherein the diol component comprises EG and from about 1 to 50 (preferably 1 to 10) mole percent CHDM and/or TMCD, based on the moles of the diol component.
9. The bifuran polyester of any preceding embodiment, wherein the bifuran polyester comprises PBBF homopolyester.
10. The bifuran polyester of any preceding embodiment, wherein the bifuran polyester comprises PBBF copolyester wherein the diol component comprises BD and from about 1 to 50 (preferably 1 to 10) mole percent CHDM and/or TMCD, based on the moles of the diol component.
11. The bifuran polyester of any preceding embodiment, wherein the bifuran polyester comprises PHBF homopolyester.
12. The bifuran polyester of any preceding embodiment, wherein the bifuran polyester comprises PHBF copolyester wherein the diol component comprises HD and from about 1 to 50 (preferably 1 to 10) mole percent CHDM and/or TMCD, based on the moles of the diol component.
13. The bifuran polyester of any preceding embodiment, wherein the bifuran polyester comprises PPBF homopolyester.
14. The bifuran polyester of any preceding embodiment, wherein the bifuran polyester comprises PPBF copolyester wherein the diol component comprises PD and from about 1 to 50 (preferably 1 to 10) mole percent CHDM and/or TMCD, based on the moles of the diol component.
15. The bifuran polyester of any preceding embodiment, wherein the diol component is selected from the group consisting of: aliphatic polyols, preferably $C_2$-$C_{20}$ alkylene diols (preferably having from 2 to 10 or from 2 to 6 carbon atoms); $C_4$-$C_{20}$ cyclic polyols; and combinations thereof.
16. The bifuran polyester of any preceding embodiment, wherein the diol component is selected from ethylene glycol, 1,4-butanediol, 1,6-hexanediol, 2,2,4,4-tetramethyl-1,3-cyclobutanediol (TMCD), 1,3-propanediol, 1,4-cyclohexanedimethanol (CHDM), neopentyl glycol (NPG), 1,2-propanediol, 1,5-pentanediol, isosorbide, isoidide, isomannide, 1,3-cyclohexanedimethanol, and combinations thereof.

17. The bifuran polyester of any preceding embodiment, wherein the diol component is selected from ethylene glycol, 1,4-butanediol, 1,6-hexanediol, and 1,3-propanediol.
18. The bifuran polyester of any preceding embodiment, wherein the diol component comprises, consists essentially of, or consists of ethylene glycol.
19. The bifuran polyester of any preceding embodiment, wherein the diol component comprises CHDM and/or TMCD.
20. The bifuran polyester of any preceding embodiment, wherein the diol component comprises a combination of an aliphatic diol, preferably ethylene glycol or 1,4-butanediol, and a cyclic diol, preferably TMCD or CHDM, preferably from 1 to 10 mole percent TMCD and/or CHDM, based on the total moles of diol component in the copolyester
21. The bifuran polyester of any preceding embodiment, wherein the diol component comprises a polyhydroxy furan compound.
22. The bifuran polyester of any preceding embodiment, wherein the diol component comprises dihydroxyalkyl bifuran, preferably 2,2'-bifuran-5,5'-dimethanol (BFD).
23. The bifuran polyester of any preceding embodiment, wherein the diacid component comprises 2,2'-bifuran-5,5'-dicarboxylate units and polyfunctional carboxylate comonomer units, preferably wherein the polyfunctional carboxylate comonomer units are selected from terephthalate, isophthalate, furan dicarboxylate, naphthalate, bibenzoate (including 3,4'-biphenyl dicarboxylate and/or 4,4'-biphenyl dicarboxylate), 1,4-cyclohexanedicarboxylate, 1,3-cyclohexanedicarboxylate, succinate, glutarate, adipate, azelate, sebacate, and combinations thereof, preferably wherein the polyfunctional carboxylate comonomer comprises terephthalate or isophthalate.
24. The bifuran polyester of embodiment 23 wherein the diacid component comprises: from about 80 to 99 mole percent 2,2'-bifuran-5,5'-dicarboxylate units and from about 20 to 1 mole percent polyfunctional carboxylate comonomer units, preferably terephthalate or isophthalate, based on the total moles of the diacid component in the copolyester, preferably wherein a sum of the mole percent 2,2'-bifuran-5,5'-dicarboxylate units and the mole percent polyfunctional carboxylate comonomer units totals 100.
25. The bifuran polyester of embodiment 23 wherein the diacid component comprises: from 90 to 98 mole percent 2,2'-bifuran-5,5'-dicarboxylate and from 10 to 2 mole percent polyfunctional carboxylate comonomer units, preferably terephthalate or isophthalate, based on the total moles of the diacid component in the copolyester, preferably wherein a sum of the mole percent 2,2'-bifuran-5,5'-dicarboxylate units and the mole percent polyfunctional carboxylate comonomer units totals 100.
26. The bifuran polyester of embodiment 23 wherein the diacid component comprises: from 92 to 97 mole percent 2,2'-bifuran-5,5'-dicarboxylate units and from 8 to 3 mole percent polyfunctional carboxylate comonomer units, preferably terephthalate or isophthalate, based on the total moles of the diacid component in the copolyester, preferably wherein a sum of the mole percent 2,2'-bifuran-5,5'-dicarboxylate units and the mole percent polyfunctional carboxylate comonomer units totals 100.
27. The bifuran polyester of any of embodiments 23-26 wherein the polyfunctional carboxylate comonomer units are present in an amount effective to modify melting temperature ($T_m$) (preferably decrease) of the 2,2'-bifuran-5,5'-dicarboxylate-co-polyfunctional carboxylate comonomer polyester without substantially decreasing $T_g$, relative to a 2,2'-bifuran-5,5'-dicarboxylate homopolyester having the same diol composition, as determined by DSC.
28. The bifuran polyester of embodiment 27 wherein the $T_m$ is decreased by an amount equal to or greater than 5° C. (preferably a decrease greater than 6° C. or a decrease greater than 8° C.) and the $T_g$ is decreased by an amount equal to or less than 5° C. (preferably a decrease of no more than 3° C.) relative to a 2,2'-bifuran-5,5'-dicarboxylate homopolyester prepared with the same diol component.
29. A reinforced composition comprising 100 parts by weight of the bifuran polyester of any preceding embodiment and from 1 to 100 parts by weight of a reinforcement material, preferably glass fibers, carbon fibers, carbon nanotubes, minerals, and combinations thereof.
30. A shaped article, preferably a container, film, fiber, or injection molded part, comprising the bifuran polyester of any preceding embodiment, more preferably a biaxially oriented film, low shrink fibers, a thermoformed tray, or an injection molded part reinforced with glass fibers, carbon fibers, carbon nanotubes, minerals, and combinations thereof.
31. A method of making a bifuran polyester, comprising:
esterifying or transesterifying one or more monomers comprising a diacid component and a diol component, optionally in the presence of a catalyst;
wherein the one or more monomers comprise a bifuran compound; and
polycondensing the esterified or transesterified monomer(s) to form a bifuran polyester comprising the diacid component and the diol component.
32. The method of embodiment 31, wherein the one or more monomers include a bifuran dicarboxylic acid and/or a di(hydroxyalkyl) bifuranoate; preferably wherein the one or more monomers comprise 2,2'-bifuran-5,5'-dicarboxylic acid (BFA), di(hydroxyalkyl)-2,2'-bifuran-5,5'-dicarboxylate (preferably bis(2-hydroxyethyl)-2,2'-bifuran-5,5'-dicarboxylate (BHEB)), or a combination thereof, and wherein the catalyst, if present, comprises a Brønsted or Lewis acid.
33. The method of embodiment 31, wherein the one or more monomers include a bifuran diester and/or a di(hydroxyalkyl) bifuranoate, preferably wherein the one or more monomers comprise dialkyl-2,2'-bifuran-5,5'-dicarboxylate, di(hydroxyalkyl)-2,2'-bifuran-5,5'-dicarboxylate, or a combination thereof; more preferably wherein the one or more monomers comprise dimethyl-2,2'-bifuran-5,5'-dicarboxylate (BFE) and/or bis(2-hydroxyethyl)-2,2'-bifuran-5,5'-dicarboxylate (BHEB);
wherein the catalyst is present, the catalyst comprises a metal catalyst, and the metal of the catalyst is present in an amount of from about 10 to 1500 ppm (preferably from about 100 to 750 ppm or from about 150 to 500 ppm, more preferably from about 200 to 400 ppm), based on the weight of theoretical yield of the polyester; preferably wherein the catalyst comprises a plurality of metal catalysts, wherein the total metal of the catalyst is present in an amount of from about 10 to 1500 ppm, preferably from about 100 to 750 ppm, and more preferably where each metal is individually present at from about 50 to 300 ppm, based on the weight of theoretical yield of the polyester.

34. The method of embodiment 33 wherein the metal of the catalyst is preferably selected from the group consisting of antimony, titanium, zinc, tin, manganese, zinc, aluminum, cobalt, bismuth, germanium, and mixtures thereof; preferably one or more of titanium, tin, manganese, zinc, and antimony.

35. The method of any of embodiments 31-34 wherein the bifuran polyester formed comprises, consists of, or consists essentially of poly(ethylene bifuranoate) and exhibits a semicrystalline melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min (and/or 15° C./min) and holding the sample at temperature for 3 min before and after the cooling ramp, preferably wherein the bifuran polyester formed exhibits one or more or all of the following: $T_g$ equal to or greater than 100° C. (preferably equal to or greater than 105° C., more preferably equal to about 105° C. to 108° C.);

$T_m$ equal to or less than 260° C. (preferably equal to or less than 255° C.); and/or $\Delta H_f$ equal to or greater than 10 J/g (preferably equal to or greater than 20 J/g, equal to or greater than 30 J/g, or equal to or greater than 40 J/g).

36. The method of any of embodiments 31-35 wherein the esterification or transesterification and polycondensation are in a melt phase.

37. The method of any of embodiments 31-36 comprising:
esterification or transesterification and polycondensation to form a prepolymer, preferably prepolymer having an inherent viscosity of from about 0.4 to 0.6 dL/g;
pelletizing and crystallizing the prepolymer; and
solid state polymerization of the crystallized prepolymer in a temperature range from a glass transition temperature of the prepolymer up to a melting temperature of the prepolymer to increase the inherent viscosity, preferably to an inherent viscosity of 0.9 dL/g or more.

38. The method of embodiment 37 wherein the solid state polymerization comprises placing the prepolymer in a rotary evaporator and rotating the evaporator, preferably with flowing nitrogen and/or under vacuum.

39. The method of embodiment 37 or embodiment 38 wherein the catalyst is added to the one or more monomers for the esterification, transesterification, or polycondensation.

40. The method of any of embodiments 37-39 wherein the catalyst comprises antimony oxide, manganese acetate, zinc acetate, or a combination thereof, preferably wherein the total metal of the catalyst is present in an amount of from about 10 to 1500 ppm, more preferably from about 100 to 750 ppm, based on the weight of the prepolymer.

41. The method of any of embodiments 31-40 wherein the one or more monomers further comprises a polyfunctional carboxylate comonomer, preferably wherein the polyfunctional carboxylate comonomer is selected from terephthalic acid (TPA), isophthalic acid (IPA), furan dicarboxylic acid (FDA), dialkyl furanoate (including dimethyl furanoate (DMF)), naphthalic acid, bibenzoic acid (including 3,4'-biphenyl dicarboxylic acid and/or 4,4'-biphenyl dicarboxylic acid), 1,4-cyclohexanedicarboxylic acid, 1,3-cyclohexanedicarboxylic acid, succinic acid, glutaric acid, adipic acid, azelaic acid, sebacic acid, or an ester forming equivalent and/or combination thereof, preferably TPA or IPA or an ester forming equivalent thereof.

42. The method of embodiment 41, wherein the diacid component comprises:
from about 80 to 99 mole percent BFA or BFE and from about 20 to 1 mole percent polyfunctional carboxylate comonomer, preferably TPA or IPA, preferably wherein a sum of the mole percent BFA or BFE and the mole percent polyfunctional carboxylate comonomer totals 100, based on the total moles of the diacid component;
preferably from 90 to 98 mole percent BFA or BFE and from 10 to 2 mole percent polyfunctional carboxylate comonomer, preferably TPA or IPA, preferably wherein a sum of the mole percent BFA or BFE and the mole percent polyfunctional carboxylate comonomer totals 100, based on the total moles of the diacid component;
more preferably from 92 to 97 mole percent BFA or BFE and from 8 to 3 mole percent polyfunctional carboxylate comonomer, preferably TPA or IPA, preferably wherein a sum of the mole percent BFA or BFE and the mole percent polyfunctional carboxylate comonomer totals 100, based on the total moles of the diacid component.

43. The method of any of embodiments 31-42, wherein the diol component is selected from the group consisting of: aliphatic polyols, preferably $C_2$-$C_{20}$ alkylene diols (preferably having from 2 to 10 or from 2 to 6 carbon atoms); $C_4$-$C_{20}$ cyclic polyols; and combinations thereof;
preferably wherein the diol component is selected from ethylene glycol (EG), 1,4-butanediol (BD), 1,6-hexanediol (HD), 2,2,4,4-tetramethyl-1,3-cyclobutanediol (TMCD), 1,3-propanediol (PD), 1,4-cyclohexanedimethanol (CHDM), neopentyl glycol (NPG), 1,2-propanediol, 1,5-pentanediol, isosorbide, isoidide, isomannide, 1,3-cyclohexanedimethanol, and combinations thereof, or
more preferably wherein the diol component is selected from EG, BD, HD, or PD; or
more preferably wherein the diol component comprises, consists essentially of, or consists of ethylene glycol; or
more preferably wherein the diol component comprises CHDM and/or TMCD; or
more preferably wherein the diol component comprises a combination of an aliphatic diol, preferably ethylene glycol or 1,4-butanediol, and a cyclic diol, preferably TMCD or CHDM, preferably from 1 to 10 mole percent TMCD and/or CHDM, based on the total moles of diol component in the copolyester; and/or
preferably wherein the one or more monomers comprise or further comprise furan dicarboxylic acid, dialkyl furanoate, or dihydroxyalkyl furanoate (preferably 2,5-dihydroxyethyl furanoate); and/or
preferably wherein the diol component comprises, further comprises, consists of, or consists essentially di(hydroxyalkyl) bifuran, preferably 2,2'-bifuran-5,5'-dimethanol (BFD).

44. The method of any of embodiments 31-43, further comprising reinforcing the bifuran polyester (preferably PEBF), preferably by combining 100 parts by weight of the bifuran polyester and from 1 to 100 parts by weight of a reinforcement material, preferably glass fibers, carbon fibers, carbon nanotubes, minerals, and combinations thereof.

45. The method of any of embodiments 31-44, further comprising forming the bifuran polyester into a shaped article, preferably a container, film, fiber, or injection molded part, more preferably a biaxially oriented film, low shrink fibers, a glass-reinforced injection molded part, or a thermoformed tray.

46. The method of embodiment 45 wherein the forming comprises injection molding, injection stretch blow-molding, or thermoforming.

EXAMPLES

In these examples, the following procedures and testing conditions were used.

Materials: Dimethyl 2,2'-bifuran-5,5'-dicarboxylic acid (BFE) was supplied by ExxonMobil Chemical company. Dimethyl isophthalate (DMI, 99%) was purchased from Sigma-Aldrich. Both diesters were dried under vacuum at 35° C. for at least 16 h and stored in a desiccator before use. Ethylene glycol (EG, >99.5%) was purchased from Sigma-Aldrich and used as received. Titanium (IV) butanol (97%) was purchased from Sigma-Aldrich, and a 0.02-0.06 g/mL titanium solution in anhydrous 1-butanol was prepared. DCA (99-%) was purchased from Alfa Aesar and used as received. Trifluoroacetic acid-d (TFA-d, 99.5 atom % D) was obtained from Sigma-Aldrich. Chloroform-d (CDCl$_3$, 99.8% atom D+0.05% V/V TMS) was obtained from Cambridge Isotope Laboratories, Inc.

NMR analysis: $^1$H NMR spectra were acquired on a BRUKER AVANCE II 500 MHz instrument with a minimum of 32 scans at 23° C. Samples were dissolved (ca. 50 mg/mL) in mixtures of TFA-d and CDCl$_3$ (approximately 5:95 v/v) and chemical shifts are measured with respect to internal tetramethylsilane (TMS). Quantitative $^{13}$C NMR confirmed that melt-phase polymerization produced completely random copolymers.

Differential scanning calorimetry: Differential scanning calorimetry (DSC) was conducted on 5-8 mg polymer samples under a nitrogen atmosphere with heating and cooling rates of 10° C./min or 15° C./min over a temperature range from 25° C. or 30° C. to 280° C. or 300° C. using Q2000 (TA Instruments, New Castle, DE). The sample was held at temperature for 1 min or 3 min between heating and cooling scans. Glass transition temperatures were determined from the midpoint of the transition inflection point on the second heating ramp.

Thermogravimetric analysis: Thermogravimetric analysis (TGA) of polymer samples (~10 mg) were analyzed using TGA Q500 (TA Instruments, New Castle, DE) at a heating rate of 10° C./min from 25° C. to 600° C. under nitrogen.

Viscosity analysis: Inherent viscosity (IV) was measured in 0.5% (g/dL) DCA solution at 25° C. by means of a CANNON TYPE B glass capillary viscometer, adapted from ASTM method D4603.

Compression molding: Polymers were melt pressed between two aluminum plates, layered with KAPTON® films using a PHI Q-230H manual hydraulic compression press. Aluminum shims were inserted to control the film thickness. REXCO PARTALL® power glossy liquid mold release agent was applied to the KAPTON® films to facilitate release of the polyesters. Samples were heated at 275° C. for 1 minute for amorphous polyesters or 3 minutes for semi-crystalline polyesters before the top stainless steel plate was added. The plates were then centered in the press and closed until there was no visible gap between plates. After two more minutes of heating at 275° C., four 30-second press-release-press cycles were completed with the first two presses utilizing 44.5 kN (5 tons) force and the last two presses utilizing 89 kN (10 tons) force. After the final press, the aluminum plates were immediately submersed in an ice water bath to quench cool the samples. Films were then isolated and dried in a vacuum oven at 40° C. overnight before further characterizations.

Tensile testing of compression-molded specimens: Dogbone samples were cut from compression molded films pressed at 260° C. for 3 min and quenched in an ice bath. Tensile testing was conducted on an INSTRON 5500R with a crosshead motion rate of 10 mm/min and an initial grip separation of 25.4±2.0 mm, and on an MTS Model No. 4204 with a 1 kN load cell and a crosshead motion rate of 5 mm/min (before 5% strain) and 10 mm/min (after 5% strain) with an initial grip-to-grip separation of 25.4±2.0 mm. Tensile modulus was estimated by crosshead displacement, but would likely be lower possibly due to sample slippage, which artificially increased the measured strain. In ASTM D638, an extensometer is generally used in the initial portion of the test to determine strain.

Injection molding: Samples were injection molded into dogbone specimens using a BOY XS injection molding machine with the following operating parameters shown in Table A.

TABLE A

| Injection Molding Parameters | |
|---|---|
| Parameter | Value |
| Molder | BOY XS |
| Barrel Temperature, Zone 1 (rear, ° C.) | 275 |
| Barrel Temperature, Zone 2 (mid, ° C.) | 290 |
| Barrel Temperature, Zone 3 (nozzle, ° C.) | 282 |
| Barrel Temperature, Zone 5 (sprue, ° C.) | 305 |
| Mold Temperature (° C.) | 13 |
| Fill Pressure (MPa (psi)) | 115.06 (16688) or 57.53 (8344) |
| Holding Pressure (MPa (psi)) | 79.10 (11473) or 53.93 (7822.5) |
| Injection Speed (mm/s) | 25 |

Example 1. Melt synthesis of semicrystalline polyethylene bifuranoate (PEBF, 10 g scale). Polymerization was performed in a dry 100 mL round bottom flask equipped with an overhead stirrer, a distillation arm, and a nitrogen inlet. EG (5.16 g, 2 mol eq.) and BFE (10.08 g, 1 mol eq.) were charged into the flask along with titanium butoxide solution (150 ppm Ti to the theoretical yield). The reaction flask was degassed with vacuum and purged with nitrogen three times to remove oxygen. The reaction flask was submerged in a metal bath and stirred at 170° C. for 1 h, then 180° C. for 1 h, then 190° C. for 2 h, all while continually purging with nitrogen and stirring at 200 rpm. The temperature of the metal bath was increased to 275° C. while vacuum was then slowly applied over the course of 20 min until a pressure of 13.3-40 Pa (0.1-0.3 mmHg) was reached. The stirring speed was reduced to 30-40 rpm and stirring was allowed to continue under vacuum for 1 h. The polymer was then removed from the flask, rinsed with DI water and vacuum dried overnight at 120° C. The NMR spectrum, DSC, and TGA are seen in FIGS. 1-3, respectively.

Figure 2:
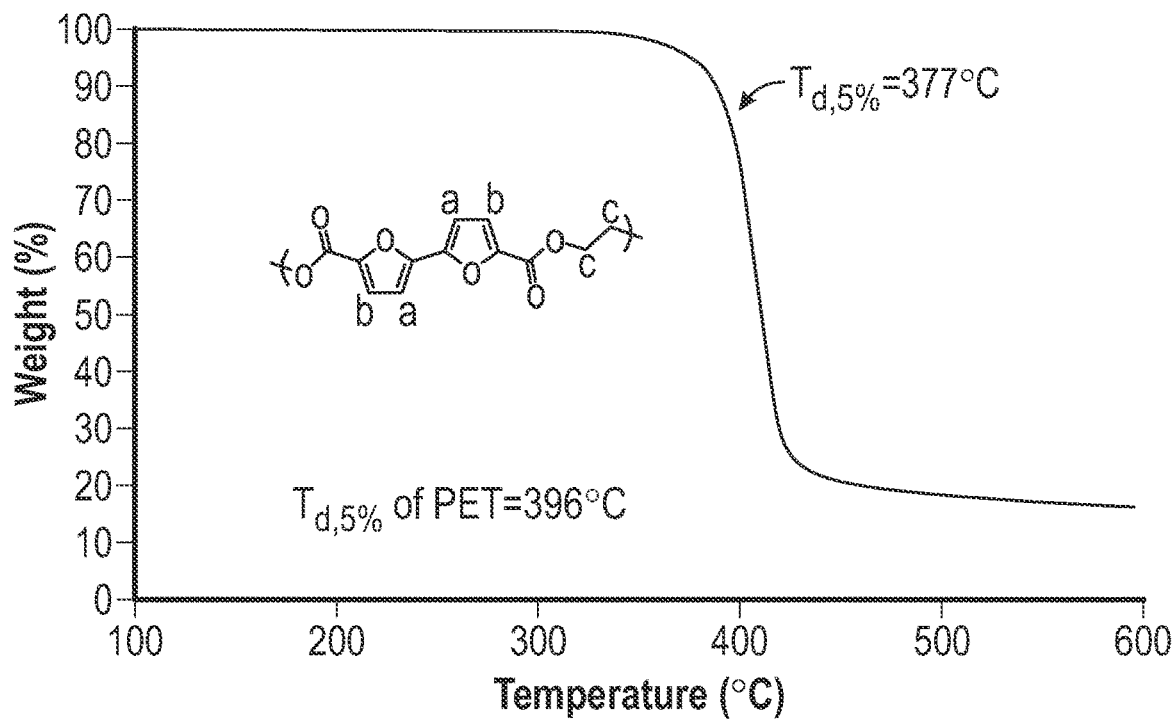
FIG. 2 is a differential scanning calorimetry (DSC) curve of the PEBF of Example 1 below according to the present invention.
Figure 3:
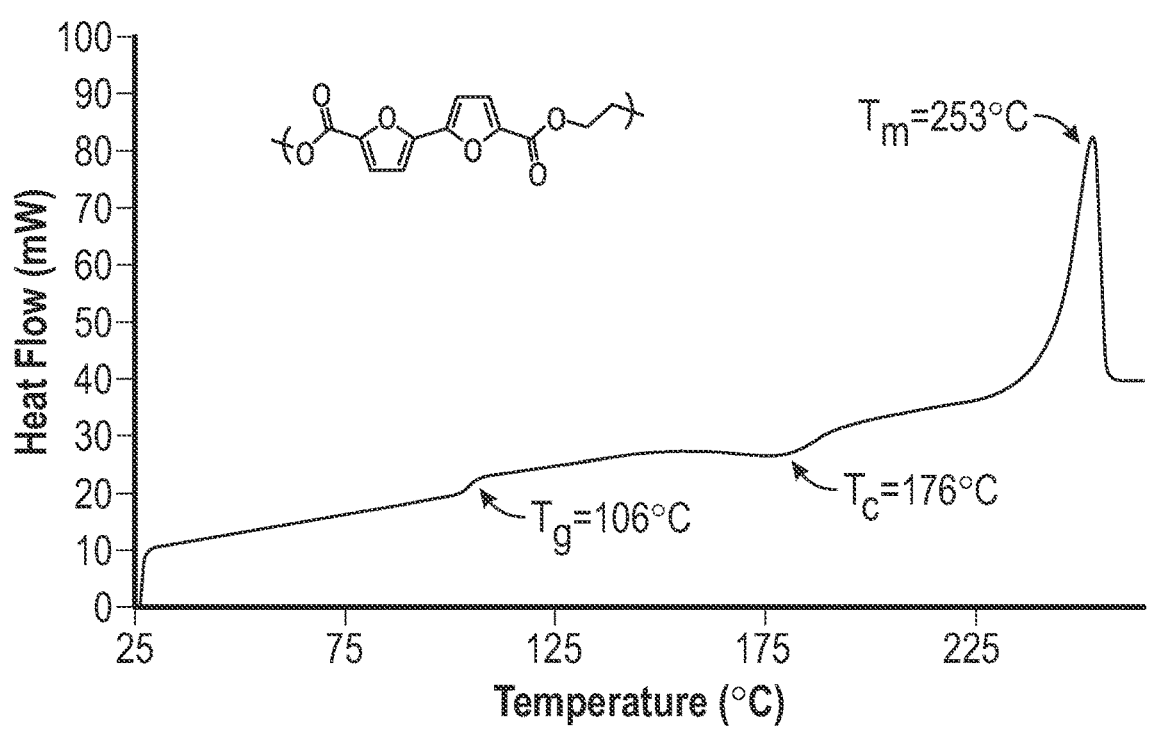
FIG. 3 is a thermal gravimetric analysis (TGA) of the PEBF of Example 1 below according to the present invention.

As seen in FIG. 2, DSC analysis in the second heating ramp gave $T_g$=106° C., $T_m$=253° C., $\Delta H_f$=42.0 J/g. TGA analysis gave $T_{d,5\%}$=377° C. Viscosity analysis gave $\eta_{inh}$=0.91 dL/g. Tensile analysis of a pressed film of the BFE-EG polymer obtained the following results:

TABLE 1

Tensile analysis of semicrystalline PEBF

| Property | Units | Value* |
|---|---|---|
| Yield stress | MPa | 158 ± 6 |
| Tensile at break | MPa | 102 ± 4 |
| Strain | % | 20 ± 10 |
| Young's modulus | MPa | 3200 ± 100 |

*Average of 3 tests.

These data show the PEBF was semicrystalline, had a high degree of crystallinity as reflected in the $\Delta H_f$ of 42 J/g, and had better ductility and modulus than the PEBF reported in the literature that exhibited no $T_m$ peak in the second heating ramp at 15° C./min.

Example 2. Synthesis of semicrystalline PEBF from solid state polymerization (10 g scale). Polymerization was performed in a dry 100 mL round bottom flask equipped with an overhead stirrer, a distillation arm, and a nitrogen inlet. EG (10.00 g, 4 mol eq.) and BFE (10.08 g, 1 mol eq.) were charged into the flask along with antimony(III) oxide (250 ppm Sb to the theoretical yield), zinc(II) acetate (150 ppm Zn to the theoretical yield), and manganese(II) acetate (150 ppm Mn to the theoretical yield). Reactions were degassed with vacuum and purged with nitrogen three times to remove oxygen. The reaction flask was submerged in a metal bath and stirred at 180° C. for 1 h, then 200° C. for 1 h, and then 220° C. for 2 h, all while continually purging with nitrogen and stirring at 200 rpm. The temperature of the metal bath was increased to 265° C. while vacuum was then slowly applied over the course of 15 min until a pressure of 13.3-40 Pa (0.1-0.3 mmHg) was reached. The stirring speed was reduced to 30 rpm and stirring was allowed to continue under vacuum for 25 min. The polymer was then removed from the flask and ground into pellets using a CUMBERLAND 6508 BESIDE-THE-PRESS granulator equipped with a 4.76 mm mesh screen. Pellets with diameters between 2 and 3 mm were isolated using 2- and 3-mm mesh screens. The PEBF obtained an $\eta_{inh}$ value of 0.63 dL/g from melt polycondensation.

Figure 4:
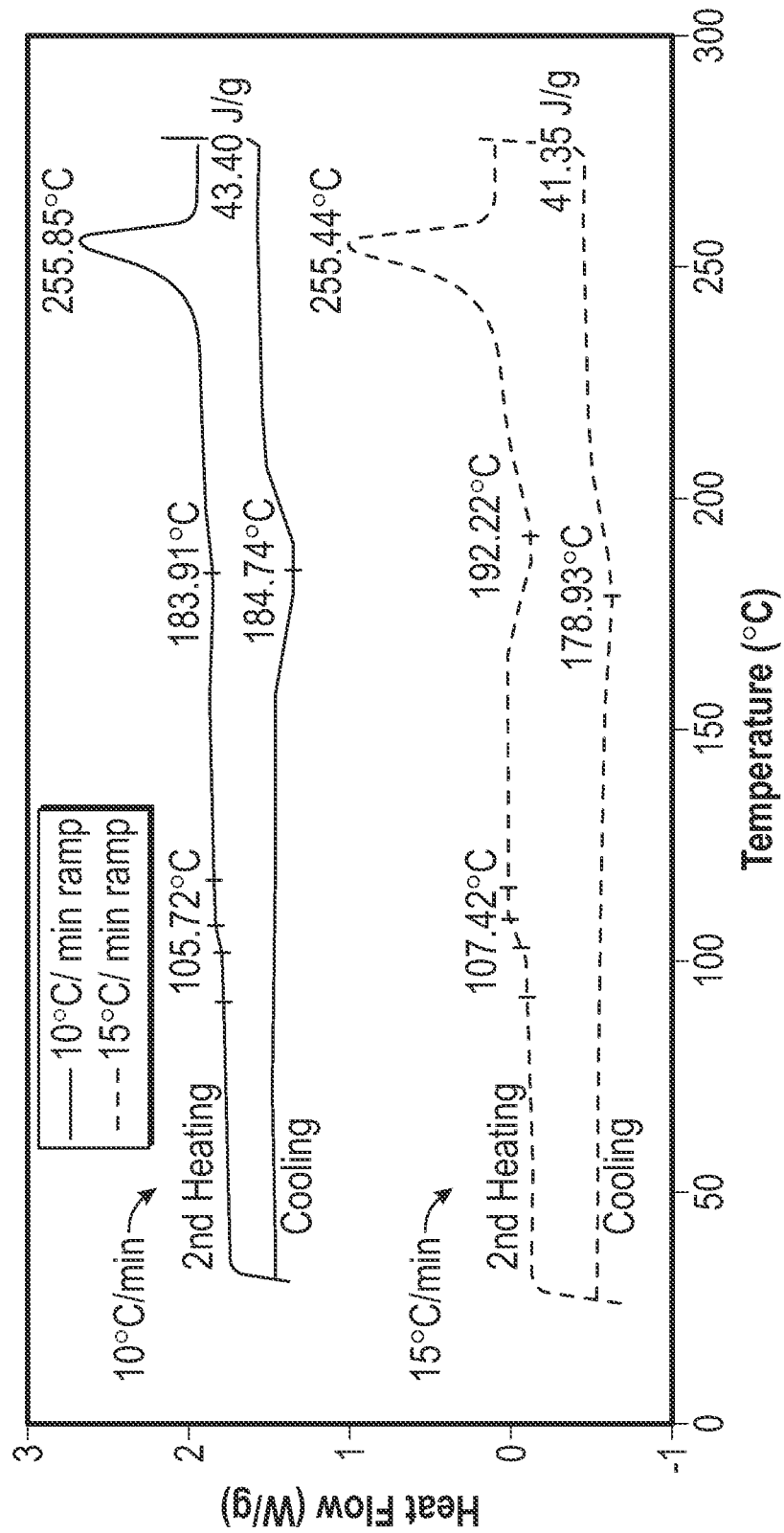
FIG. 4 shows DSC curves of the PEBF of Example 2 below at heating and cooling rates of 10° C./min or 15° C./min according to the present invention.

The isolated 2-3 mm prepolymer pellets were placed in a 100 mL round bottom flask, which was then attached to a rotary evaporator equipped with an oil bath. The flask was submerged into a 150° C. bath and allowed to rotate for 16 h at 26.7 Pa (0.2 mmHg) to allow for complete drying of the pellets. The temperature was then increased to 220° C. for 16 h at 26.7 Pa. Measured particles obtained an $\eta_{inh}$ value of 0.75 dL/g after solid state polymerization. The diethylene glycol (DEG) level was measured at 4.3 mol % by using $^1$H NMR. The PEBF was then analyzed by DSC with a heat/cool/reheat protocol at 10° C./min and 15° C./min with temperature ranges of 30° C.-280° C. and 25° C.-300° C. and a 1 min hold time. The DSC scans for the 30° C.-280° C. cooling and reheat cycles are seen in FIG. 4, and the thermal properties are shown in Table 2. The DSC scans were repeated at a temperature range of 25° C.-300° C., and the data are also shown in Table 2. The PEBF was semicrystalline, and although the first heat generally exhibited a higher $\Delta H_f$ (63 J/g in the first heat at 15° C./min from 25° C. to 300° C.), the second heat melting peaks were still large. The faster heat/cool rate gave a slightly lower $\Delta H_f$ and higher $T_g$ than the slower rate, consistent with a slight loss of crystallinity in the faster cooling cycles. Thus, the PEBF crystallization failure reported in Kainulainen et al. could not be attributed solely to the faster heating ramp.

TABLE 2

Thermal properties of PEBF by DSC, second heating ramp

| DSC Heating/Cooling Rate | DSC T Range (° C.) | $T_g$ (° C.) | $T_c$ (° C.) | $T_m$ (° C.) | $\Delta H$ (J/g) |
|---|---|---|---|---|---|
| 10° C./min | 30-280 | 105.7 | 183.9 | 255.8 | 43.4 |
|  | 25-300 | 105.0 | 186.1 | 253.8 | 43.4 |
| 15° C./min | 30-280 | 107.4 | 192.2 | 255.4 | 41.4 |
|  | 25-300 | 107.7 | 196.5 | 254.8 | 38.7 |

Example 3. Semicrystalline PEBF synthesis by solid state polymerization (15 g scale). Polymerization was performed in a dry 100 mL round bottom flask equipped with an overhead stirrer, a distillation arm, and a nitrogen inlet. EG (15.00 g, 4 mol eq.) and BFE (15.12 g, 1 mol eq.) were charged into the flask along with antimony(III) oxide (250 ppm Sb to the theoretical yield), zinc(II) acetate (150 ppm Zn to the theoretical yield) and manganese(II) acetate (150 ppm Mn to the theoretical yield). Reactions were degassed with vacuum and purged with nitrogen three times to remove oxygen. The reaction flask was submerged in a metal bath and stirred at 180° C. for 7 h while continually purging with nitrogen and stirring at 200 rpm. The temperature of the metal bath was increased to 260° C. while vacuum was then slowly applied over the course of 30 min until a pressure of 13.3-40 Pa (0.1-0.3 mmHg) was reached. The stirring speed was reduced to 30 rpm and stirring was allowed to continue under vacuum for 25 min. The prepolymer was then removed from the flask and ground into 2-3 mm pellets using the procedure of Example 2. The PEBF obtained an $\eta_{inh}$ value of 0.53 dL/g from melt polycondensation.

The isolated 2-3 mm pellets were placed in a 100 mL round bottom flask which was then attached to a rotary evaporator equipped with an oil bath. The flask was submerged into a 150° C. bath and allowed to rotate for 16 h at 26.7 Pa (0.2 mmHg) to allow for complete drying of the pellets. The temperature was then increased to 210-215° C. for 16 h at 26.7 Pa. Measured particles obtained an $\eta_{inh}$ value of 0.68 dL/g after solid state polymerization.

Example 4. Semicrystalline PEBF synthesis by solid state polymerization (10 g scale). Polymerization was performed in a dry 100 mL round bottom flask equipped with an overhead stirrer, a distillation arm, and a nitrogen inlet. EG (10.00 g, 4 mol eq.) and BFE (10.08 g, 1 mol eq.) were charged into the flask along with antimony(III) oxide (250 ppm Sb to the theoretical yield), zinc(II) acetate (150 ppm Zn to the theoretical yield) and manganese(II) acetate (150 ppm Mn to the theoretical yield). Reactions were degassed with vacuum and purged with nitrogen three times to remove oxygen. The reaction flask was submerged in a metal bath and stirred at 180° C. for 5 h while continually purging with nitrogen and stirring at 200 rpm. The temperature of the metal bath was increased to 260° C. while vacuum was then slowly applied over the course of 30 min until a pressure of 13.3-40 Pa (0.1-0.3 mmHg) was reached. The stirring speed was reduced to 30 rpm and stirring was allowed to continue under vacuum for 45 min. The prepolymer was then removed from the flask and ground into 2-3 mm pellets using the procedure of Example 2. PEBF from melt polycondensation had an $\eta_{inh}$ value of 0.74 dL/g.

Isolated pellets were placed in a 100 mL round bottom flask which was then attached to a rotary evaporator equipped with an oil bath. The flask was submerged into a 150° C. bath and allowed to rotate for 16 h at 26.7 Pa (0.2 mmHg) to allow for complete drying of the pellets. The temperature was then increased to 210-215° C. for 7 h at 26.7 Pa followed by an increase to 235° C. for another 7 h at 26.7 Pa. Measured particles obtained an $\eta_{inh}$ value of 0.87 dL/g after solid state polymerization.

Figure 5:
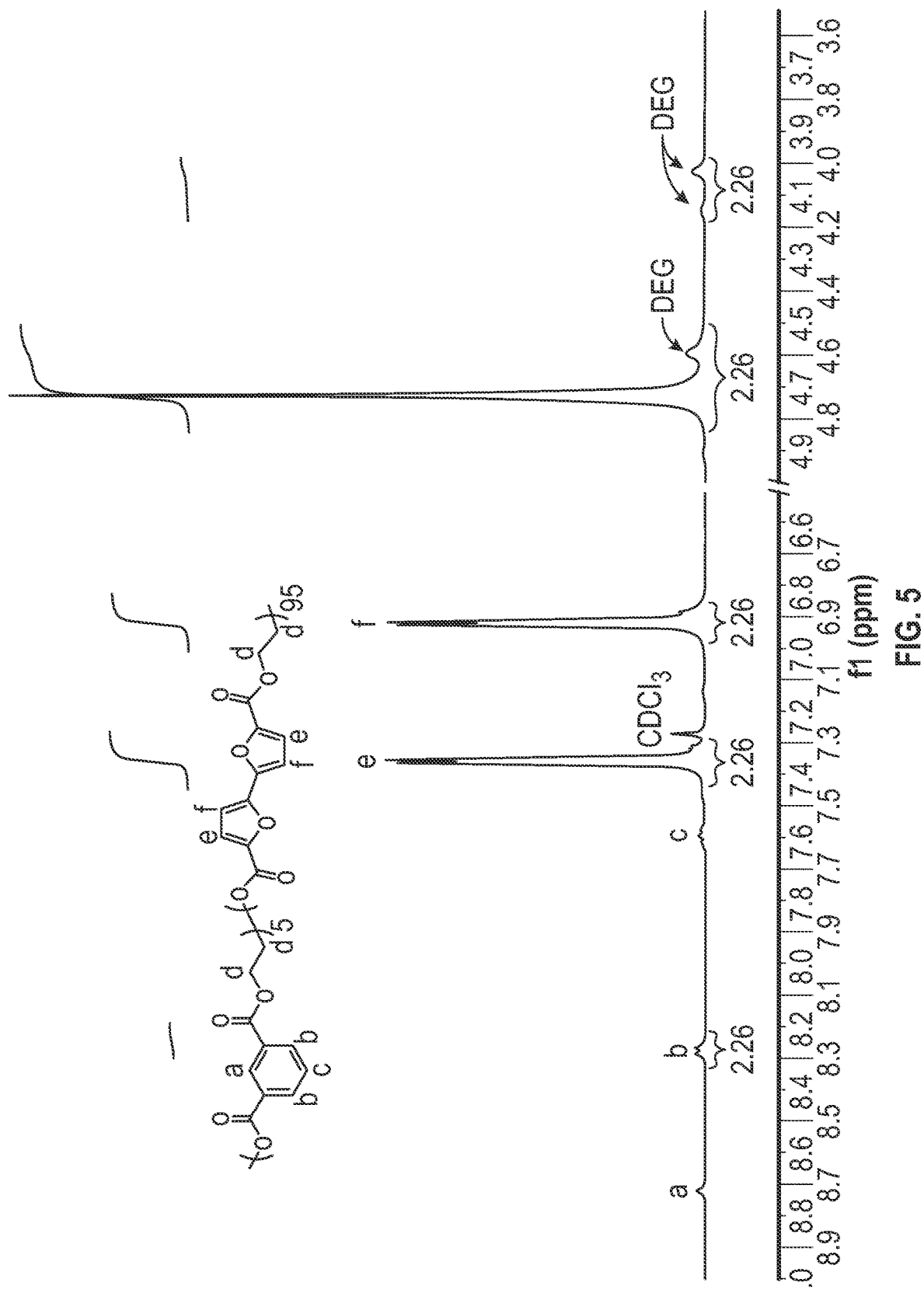
FIG. 5 is an NMR spectrum of the poly(ethylene-2,2'-bifuran-5,5'-dicarboxylate-5 mol %-isophthalate) (PEBFI)) of Example 5 below according to the present invention.
Figure 6:
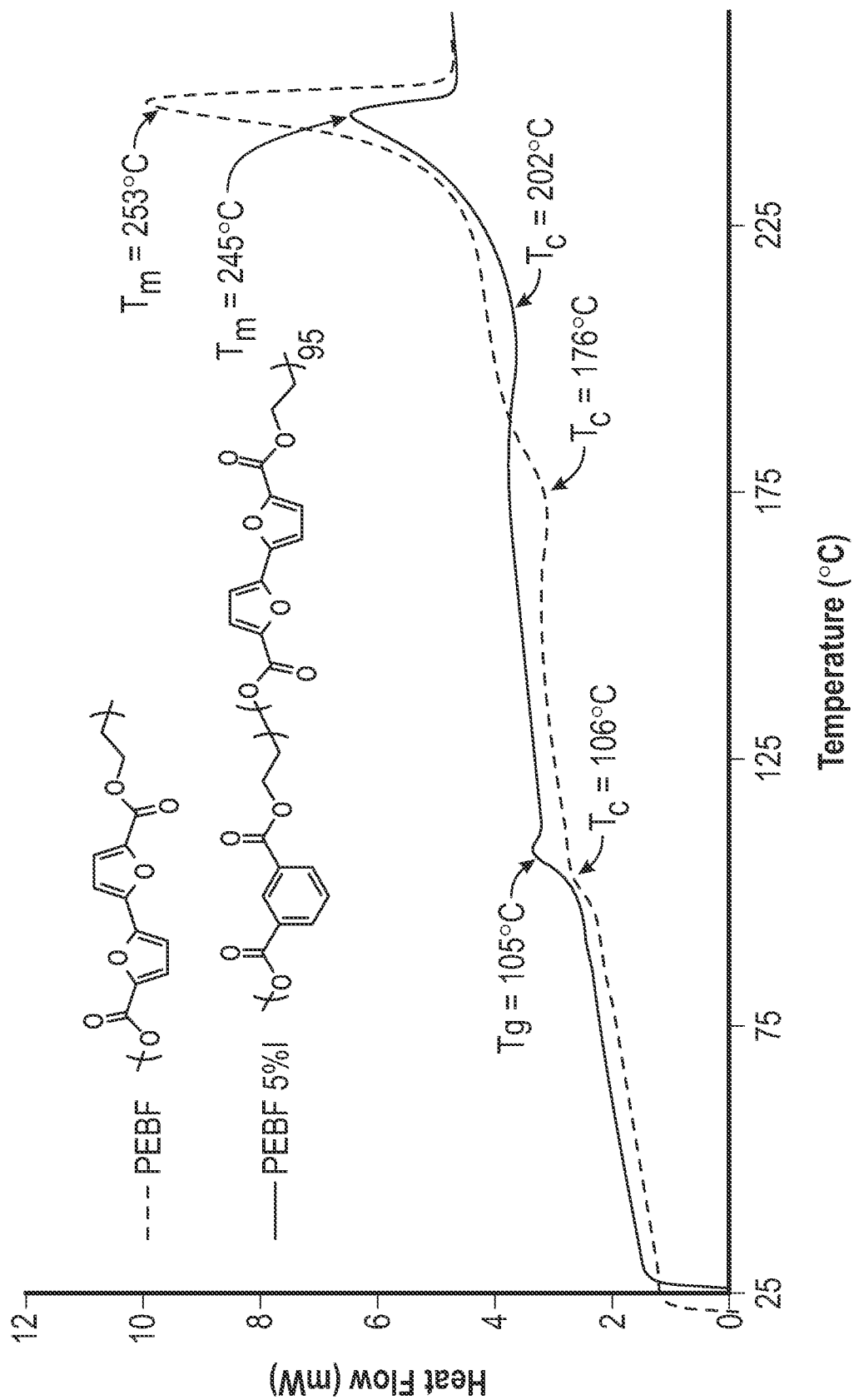
FIG. 6 is a DSC curve of the PEBFI of Example 5 below according to the present invention, compared with the DSC of the PEBF of Example 1.

Example 5. BFE-5-I-EG copolyester synthesis (10 g scale). Copolyester modified with DMI was synthesized following a similar procedure as in Example 1 with a similar reaction setup, excluding the following: BFE (9.67 g, 0.95 mol eq.) and DMI (0.40 g, 0.05 mol eq.) were charged into the flask, polycondensation continued at 240° C. for 15 min. The NMR spectrum is seen in FIG. 5. The DSC is compared to the PEBF of Example 1 in FIG. 5, and a summary of the thermal properties is presented in Table 3.

TABLE 3

Summary of compositional and thermal analysis

| Polymer | $T_g$ (° C.) | $T_m$ (° C.) | ΔH (J/g) | Composition* | $T_{d,\,5\%}$ (° C.) | $\eta_{inh}$ (dL/g) |
|---|---|---|---|---|---|---|
| Example 1 | 106 | 253 | 42.0 | 100% BDC | 377 | 0.91 |
| Example 5 | 105 | 245 | 17.0 | 95% BDC, 5% IA | 346 | 0.67 |

*$^1$H NMR

Example 6. BFE-(2.5 mol %)-CHDM-EG copolyester synthesis (10 g scale). Copolyester modified with 2 mol % CHDM was synthesized by charging EG and CHDM into the flask, polycondensation continued at 220° C. for 4 h, and then 255° C. at 26.7 Pa (0.2 mmHg) for 30 min. The copolyesters turned brownish black and degraded at the higher transesterification temperature.

Figure 7:
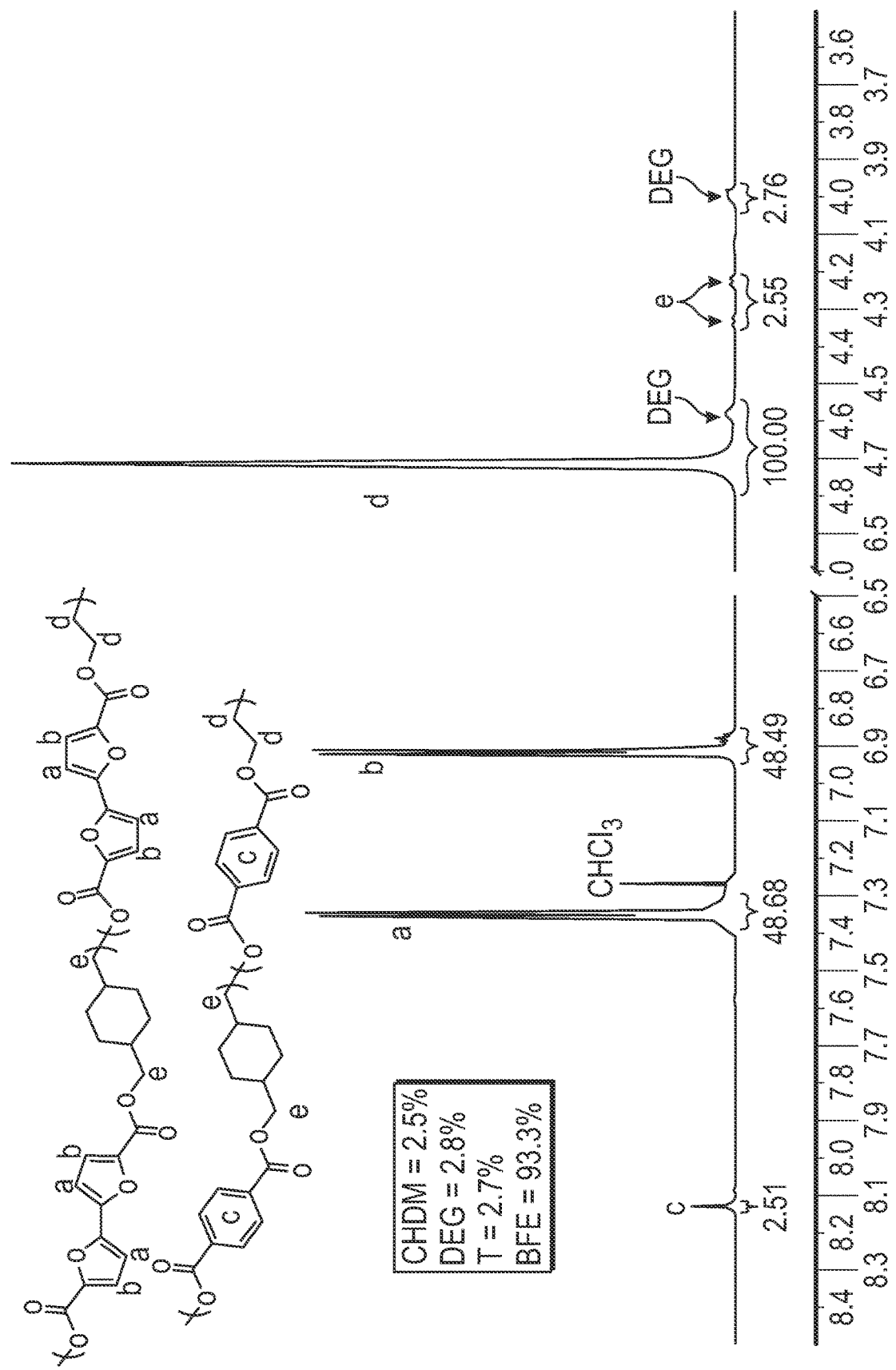
FIG. 7 is an NMR spectrum of the poly(2,2'-bifuran-5,5'-dicarboxylate-3 mol %-terephthalate-ethylene glycol-3 mol %-CHDM) of Example 7 below according to the present invention.

Example 7. BFE-T-CHDM-EG copolyester synthesis (10 g scale). Successful synthesis of a CHDM- and terephthalate-modified PEBF copolyester was conducted by charging BFE, DMT, EG, and CHDM to the flask and polycondensation at 220° C. for 10 min, then 190° C. for 4 h, and 255° C. at 26.7 Pa (0.2 mmHg) for 30 min. A tough, dark yellow to brown material with $\eta_{inh}$=0.87 dL/g was obtained. The NMR spectrum is shown in FIG. 7, and indicates the polyester comprised 93.3 mol % BFE, 2.7 mol % T, 2.5 mol % CHDM, and 2.8 mol % DEG.

Example 8. Tensile properties of injection molded PEBF. Polymerization was performed in a dry 250 mL round bottom flask equipped with an overhead stirrer, a distillation arm, and a nitrogen inlet. EG (75 g, 4 mol eq.) and BFE (75.61 g, 1 mol eq.) were charged into the flask along with titanium(IV) butoxide (250 ppm Ti to the theoretical yield). Reactions were degassed with vacuum and purged with nitrogen three times to remove oxygen. The reaction flask was submerged in a metal bath at 180° C. for 5 h while continually purging with nitrogen and stirring at 200 rpm. The temperature of the metal bath was increased to 260° C. while vacuum was then slowly applied over the course of 30 min until a pressure of 26.7-40 Pa (0.2-0.3 mmHg) was reached. The stirring speed was reduced to 30 rpm and stirring was allowed to continue under vacuum for 1 h. The polyester obtained an $\eta_{inh}$ value of 0.69 dL/g from melt polycondensation. The DEG level was measured at 2.1 mol % by $^1$H NMR.

The PEBF was injection molded on the BOY XS molding machine as described above with fill/holding pressures of 115.06/79.10 MPa. Flexural modulus was tested for 5 specimens of PEBF 8A, followed by tensile testing of the flex-tested specimens. The tensile testing was repeated on another 5 specimens that had not been flex tested (PEBF 8B) to see if the results were compromised by the flex testing history. These data are presented in Table 4 below along with a PET control molded using the same parameters for purposes of comparison. The inventive specimens had higher flexural modulus and tensile modulus, similar tensile stress at maximum load, and lower strain to failure, compared to the commercially available PET.

Example 9. Tensile properties of injection molded PEBF from SSP. Polymerization was performed in a dry 250 mL round bottom flask equipped with an overhead stirrer, a distillation arm, and a nitrogen inlet. EG (75 g, 4 mol eq.) and BFE (75.61 g, 1 mol eq.) were charged into the flask along with antimony(III) oxide (250 ppm Sb to the theoretical yield), zinc(II) acetate (150 ppm Zn to the theoretical yield) and manganese(II) acetate (150 ppm Mn to the theoretical yield). Reactions were degassed with vacuum and purged with nitrogen three times to remove oxygen. The reaction flask was submerged in a metal bath at 180° C. for 2 h, then 200° C. for 1 h and then 220° C. for 2 h, all while continually purging with nitrogen and stirring at 200 rpm. The temperature of the metal bath was increased to 270° C. while vacuum was then slowly applied over the course of 15 min until a pressure of 33.3 Pa (0.25 mmHg) was reached. The stirring speed was reduced to 30 rpm and stirring was allowed to continue under vacuum for 40 min. Polyester obtained an $\eta_{inh}$ value of 0.54 dL/g from the melt polycondensation. Yield was 67 g.

The polymer was removed from the flask and ground into pellets using a CUMBERLAND 6508 BESIDE THE PRESS granulator equipped with a 4.76 mm mesh screen. Pellets with diameters between 2 and 3 mm were isolated using 2 and 3 mm mesh screens. The pellets (41 g) were placed in a 250 mL round bottom flask which was then attached to a rotary evaporator equipped with an oil bath. The flask was submerged into a 150° C. bath and allowed to rotate for 16 h at 26.7 Pa (0.2 mmHg) to allow for complete drying of the pellets. The temperature was then increased to 225° C. for 16 h at 26.7 Pa. Measured particles obtained $\eta_{inh}$ of 0.72 dL/g after SSP, and the DEG level was 3.1 mol % by $^1$H NMR.

The PEBF was injection molded on the BOY XS molding machine as described above with fill/hold pressures of 57.53/53.93 MPa. Flexural modulus was tested for 5 specimens (PEBF 9A), followed by tensile testing of the flex-tested specimens. The tensile testing was repeated on another 2 specimens (PEBF 9B and 9C) that had not been flex tested to see if the results were compromised by the flex testing history. These data are also presented in Table 4 below. The fill/hold pressures for the Example 9 specimens were much lower than for Example 8, and the tensile properties had a much higher tensile stress at maximum load more typical of an amorphous material. One of the specimens that had not been flex-tested (PEBF 9B) was more ductile and showed a markedly higher tensile strain to failure.

TABLE 4

Tensile testing of injection molded PEBF and PET

| Property | PET A (Comp.) | PET B (Comp.) | PEBF 7A | PEBF 7B | PEBF 8A | PEBF 8B | PEBF 8C |
|---|---|---|---|---|---|---|---|
| $\eta_{inh}$, dg/L | ND | ND | 0.69 | 0.69 | 0.72 | 0.72 | 0.72 |
| Fill Pressure, MPa (psi) | 115.06 (16688) | 115.06 (16688) | 115.06 (16688) | 115.06 (16688) | 57.53 (8344) | 57.53 (8344) | 57.53 (8344) |
| Hold Pressure, MPa (psi) | 79.10 (11473) | 79.10 (11473) | 79.10 (11473) | 79.10 (11473) | 53.93 (7822.5) | 53.93 (7822.5) | 53.93 (7822.5) |
| No. Specimens | 5 | 5 | 5 | 5 | 5 | 1 | 1 |
| Flexural Modulus, MPa | 2190 ± 20 | ND | 3170 ± 100 | ND | 3240 ± 60 | ND | ND |
| Tensile Modulus, MPa | 2570 ± 130 | 2760 ± 160 | 4210 ± 240 | 4360 ± 1000 | 3950 ± 330 | 3760 | 4070 |
| Max. Tensile Stress, MPa | 56.72 ± 0.27 | 57.06 ± 0.20 | 46.04 ± 6.2 | 41.70 ± 15 | 67.58 ± 23.5 | 107.3 | 108.4 |
| Tensile Strain to Failure, % | 340 ± 20 | 330 ± 8.6 | 1.4 ± 0.2 | 1.2 ± 0.3 | 5.0 ± 7.0 | 17.6 | 5 |

Although only a few example embodiments have been described in detail above, those skilled in the art will readily appreciate that many modifications are possible in the example embodiments without materially departing from this invention. Accordingly, all such modifications are intended to be included within the scope of this invention as defined in the following claims. It is the express intention of the applicant not to invoke 35 U.S.C. § 112(f) for any limitations of any of the claims herein, except for those in which the claim expressly uses the words 'means for' together with an associated function and without any recitation of structure. The priority document is incorporated herein by reference.

What is claimed is:

1. A bifuran polyester comprising:
polyethylene-2,2'-bifuran-5,5'-dicarboxylate (PEBF) homopolyester or copolyester comprising up to 5 mole percent isophthalate or up to 2.7 mole percent terephthalate, based on total moles of a diacid component, or up to 2.5 mole percent 1,4-cyclohexanedimethanol (CHDM), based on total moles of a diol component; and
wherein the bifuran polyester is prepared by a method comprising: esterifying or transesterifying the diacid component and the diol component in the presence of a catalyst compound comprising metal present in an amount of from about 10 to about 550 ppm, based on the weight of the bifuran polyester; and polycondensation to form the bifuran polyester with an intrinsic viscosity of at least 0.4 g/dL and a semicrystalline melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp, wherein:
(a) a melt-pressed specimen of the bifuran polyester has an elongation at break equal to or greater than 10% according to ASTM D638 and one or more or all of the following tensile properties measured from a melt-pressed specimen according to ASTM D638:
a yield stress equal to or greater than 80 MPa;
a tensile stress at break equal to or greater than 50 MPa; or
a Young's modulus equal to or greater than 2600 MPa; and
(b) an injection molded specimen of the bifuran polyester has one or more or all of the following tensile properties measured from an injection molded specimen according to ASTM D638:
flexural modulus equal to or greater than 2500 MPa;
a tensile modulus equal to or greater than 3000 MPa; or
a tensile stress at maximum load equal to or greater than 40 MPa.

2. The bifuran polyester of claim 1, comprising:
semicrystalline polyethylene-2,2'-bifuran-5,5'-dicarboxylate (PEBF) having a melting peak ($T_m$) with $\Delta H_f$ equal to or greater than 10 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.

3. The bifuran polyester of claim 1, wherein the bifuran polyester is polyethylene-2,2'-bifuran-5,5'-dicarboxylate (PEBF) homopolyester.

4. The bifuran polyester of claim 1, wherein the bifuran polyester is the copolyester.

5. The bifuran polyester of claim 1 wherein the bifuran polyester exhibits oxygen permeability less than 0.25 cc[STP]-cm/m²-day-atm.

6. A reinforced composition comprising 100 parts by weight of the bifuran polyester of claim 5 and from 1 to 100 parts by weight of a reinforcement material.

7. A shaped article, comprising the bifuran polyester of claim 5.

8. A reinforced composition comprising 100 parts by weight of the bifuran polyester of claim 1 and from 1 to 100 parts by weight of a reinforcement material.

9. A shaped article, comprising the bifuran polyester of claim 1.

10. A method of making the bifuran polyester according to claim 1, comprising:
esterifying or transesterifying a diacid component and the diol component in the presence of a catalyst comprising a metal present in an amount of from about 10 to about 550 ppm,
based on the weight of the bifuran polyester; and
polycondensation to form the bifuran polyester having an intrinsic viscosity of at least 0.4 g/dL and a semicrystalline melting peak ($T_m$) with $\Delta H_f$ equal to or greater than 5 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.

11. The method of claim 10, wherein the bifuran polyester has a semicrystalline melting peak ($T_m$) with $\Delta H_f$ equal to or greater than 10 J/g on the second heating ramp in a heat/cool/reheat differential scanning calorimetry (DSC) scan over a temperature range from 30° C. to 300° C. with heating and cooling rates of 10° C./min and holding the sample at temperature for 3 min before and after the cooling ramp.

12. The method of claim 10, wherein the esterification or transesterification and polycondensation are in a melt phase.

13. The method of claim 10, comprising:
esterification or transesterification and polycondensation to form a prepolymer having an inherent viscosity of from about 0.4 to 0.6 dL/g;
pelletizing and crystallizing the prepolymer; and
solid state polymerization of the crystallized prepolymer in a temperature range from a glass transition temperature of the prepolymer up to a melting temperature of the prepolymer to increase the inherent viscosity to 0.9 dL/g or more.

14. The bifuran polyester of claim 1, wherein the metal comprises titanium present in an amount up to about 100 ppm, based on the weight of the bifuran polyester.

15. The bifuran polyester of claim 1, wherein the metal comprises tin, zinc, and manganese, in amounts up to about 250 ppm, about 150 ppm, and about 150 ppm, respectively, based on the weight of the bifuran polyester.

16. The method of claim 10, wherein the metal comprises titanium in an amount up to about 100 ppm, based on the weight of the bifuran polyester.

17. The method of claim 10, wherein the metal comprises tin, zinc, and manganese, in amounts up to about 250 ppm, about 150 ppm, and about 150 ppm, respectively, based on the weight of the bifuran polyester.

* * * * *